US011060909B2

(12) United States Patent
Noguchi et al.

(10) Patent No.: US 11,060,909 B2
(45) Date of Patent: Jul. 13, 2021

(54) SPECTROMETER, ANALYSIS EQUIPMENT, AND WAVELENGTH-VARIABLE LIGHT SOURCE

(71) Applicants: Hidetaka Noguchi, Hyogo (JP); Junichi Azumi, Miyagi (JP); Hidenori Kato, Hyogo (JP); Masashi Suematsu, Hyogo (JP); Masayuki Fujishima, Kanagawa (JP); Shuichi Suzuki, Osaka (JP)

(72) Inventors: Hidetaka Noguchi, Hyogo (JP); Junichi Azumi, Miyagi (JP); Hidenori Kato, Hyogo (JP); Masashi Suematsu, Hyogo (JP); Masayuki Fujishima, Kanagawa (JP); Shuichi Suzuki, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 26 days.

(21) Appl. No.: 16/470,476

(22) PCT Filed: Dec. 20, 2017

(86) PCT No.: PCT/JP2017/045752
§ 371 (c)(1),
(2) Date: Jun. 17, 2019

(87) PCT Pub. No.: WO2018/135223
PCT Pub. Date: Jul. 26, 2018

(65) Prior Publication Data
US 2020/0088572 A1 Mar. 19, 2020

(30) Foreign Application Priority Data

Jan. 20, 2017 (JP) .............................. JP2017-008806
Sep. 19, 2017 (JP) .............................. JP2017-178919

(51) Int. Cl.
*G01J 3/02* (2006.01)
*G01J 3/18* (2006.01)

(52) U.S. Cl.
CPC ............. *G01J 3/021* (2013.01); *G01J 3/0259* (2013.01); *G01J 3/0289* (2013.01); *G01J 3/18* (2013.01)

(58) Field of Classification Search
CPC ................................................ G01J 2003/064
See application file for complete search history.

(56) References Cited

U.S. PATENT DOCUMENTS 5,442,440 A * 8/1995 Harada ..................... G01J 3/28
356/300
5,889,588 A 3/1999 Santman et al.
(Continued)

FOREIGN PATENT DOCUMENTS

DE 19955759 A1 5/2001
DE 102004046983 A1 4/2006
(Continued)

OTHER PUBLICATIONS

International Search Report and Written Opinion dated Jun. 15, 2018 in PCT/JP2017/045752 filed on Dec. 20, 2017.
(Continued)

*Primary Examiner* — Shawn Decenzo
(74) *Attorney, Agent, or Firm* — Oblon, McClelland, Maier & Neustadt, L.L.P.

(57) ABSTRACT

(Object) To enable to provide a small-scale and low-cost spectrometer (Means of Achieving the Object) A spectrometer includes: a light incidence unit configured to allow incidence of light from outside; a diffraction grating configured to disperse, according to wavelength, the light that is incident through the light incidence unit; and a reflection unit including a reflection surface for reflecting the light that
(Continued)

has been dispersed according to wavelength by the diffraction grating. Tilt of the reflection surface is changeable.

22 Claims, 17 Drawing Sheets

(56) References Cited

U.S. PATENT DOCUMENTS

| | | | |
|---|---|---|---|
| 6,870,619 B1 | 3/2005 | Tenhunen et al. | |
| 8,351,032 B2* | 1/2013 | Grueger | G01J 3/10 |
| | | | 356/326 |
| 8,861,060 B2* | 10/2014 | Puegner | G01J 3/021 |
| | | | 359/209.1 |
| 9,625,317 B2* | 4/2017 | Correns | G01J 3/2823 |
| 9,784,619 B2* | 10/2017 | Zhu | G01J 3/0237 |
| 9,976,900 B2 | 5/2018 | Yokino et al. | |
| 10,060,792 B2* | 8/2018 | Yokino | G01J 3/04 |
| 10,317,281 B2* | 6/2019 | Wang | G01J 3/021 |
| 10,480,999 B2* | 11/2019 | Yokino | G01J 3/36 |
| 10,732,040 B2* | 8/2020 | Grueger | G01J 3/0259 |
| 10,739,198 B2* | 8/2020 | Grueger | G01J 3/1804 |
| 10,775,236 B2* | 9/2020 | Yokino | G01J 3/0256 |
| 2004/0246477 A1 | 12/2004 | Moon et al. | |
| 2005/0052649 A1 | 3/2005 | Tsujita | |
| 2007/0103679 A1* | 5/2007 | Yoo | G01J 3/0218 |
| | | | 356/301 |
| 2007/0103682 A1* | 5/2007 | Yoo | G01J 3/0291 |
| | | | 356/318 |
| 2007/0160325 A1 | 7/2007 | Son et al. | |
| 2009/0262346 A1* | 10/2009 | Egloff | G01J 3/02 |
| | | | 356/326 |
| 2009/0303562 A1* | 12/2009 | Koeppen | G02B 6/29311 |
| | | | 359/212.1 |
| 2012/0218547 A1 | 8/2012 | Konradi et al. | |
| 2017/0102269 A1* | 4/2017 | Zhu | G02B 6/02076 |

FOREIGN PATENT DOCUMENTS

| | | |
|---|---|---|
| DE | 102008019600 A1 | 10/2009 |
| DE | 102009043745 A1 | 4/2011 |
| JP | 11-132847 A | 5/1999 |
| JP | 2015-148485 | 8/2015 |
| JP | 2015-219153 | 12/2015 |
| JP | 2017-219330 | 12/2017 |
| WO | 2001/023848 A1 | 4/2001 |

OTHER PUBLICATIONS

Combined Chinese Office Action and Search Report dated Nov. 11, 2020 in corresponding Chinese Patent Application No. 201780083296.X (with English Translation), 15 pages.

Office Action dated Jul. 2, 2020 in corresponding Canadian Patent Application No. 3,045,981, 6 pages.

* cited by examiner

[Fig. 1]
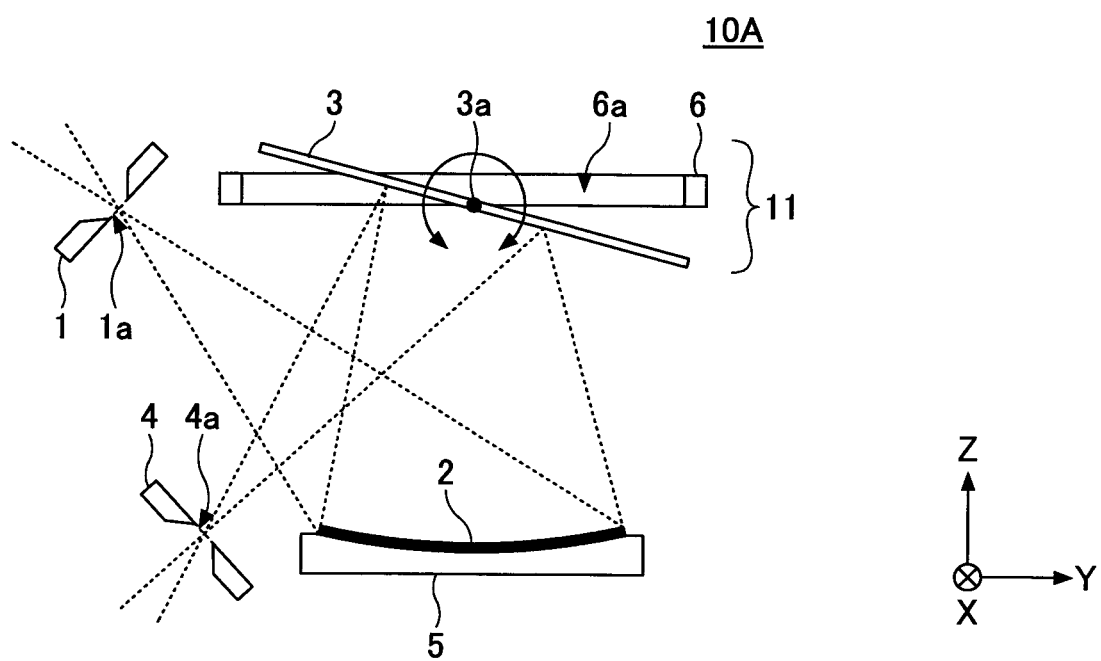

[Fig. 2]
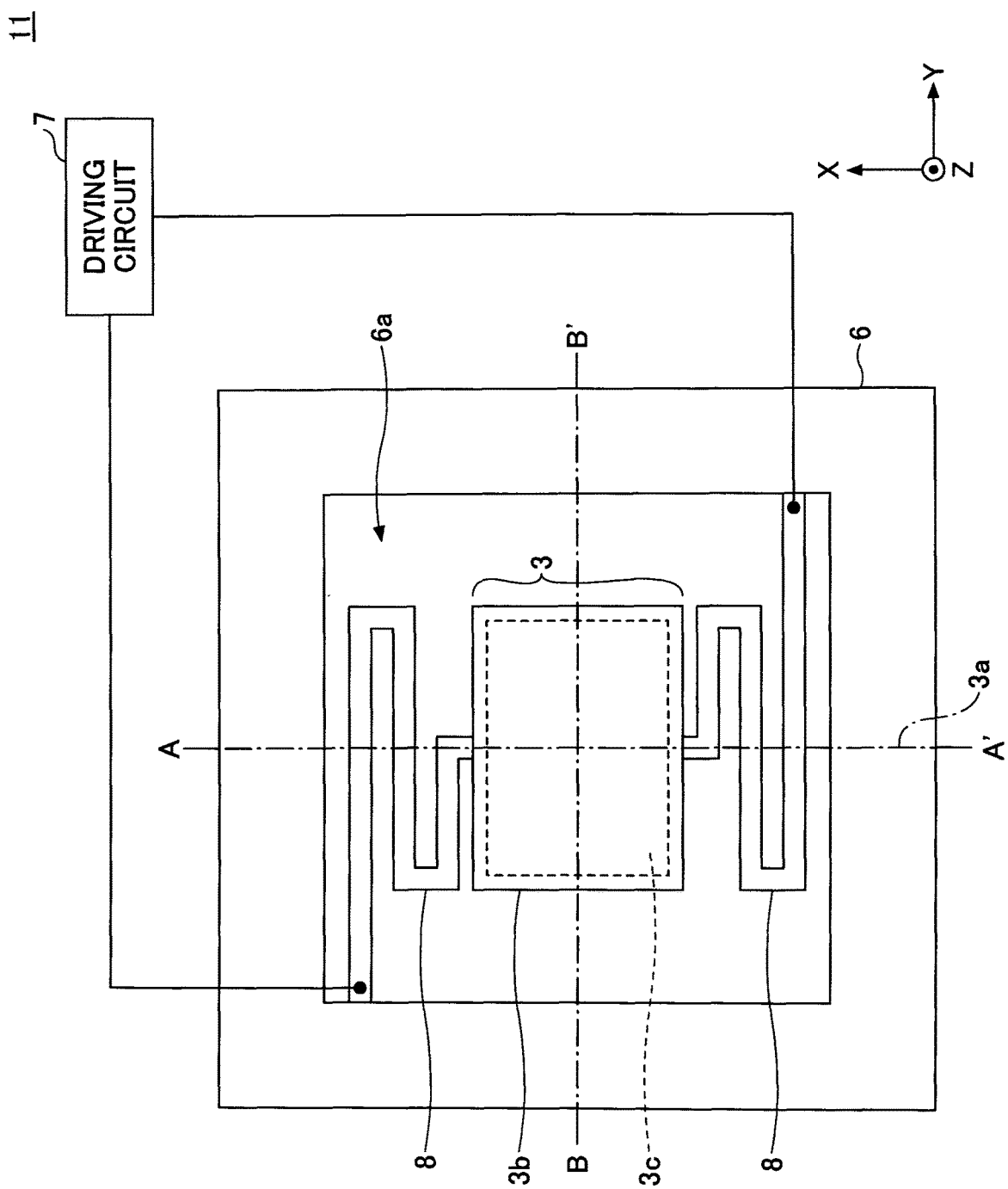

[Fig. 3]
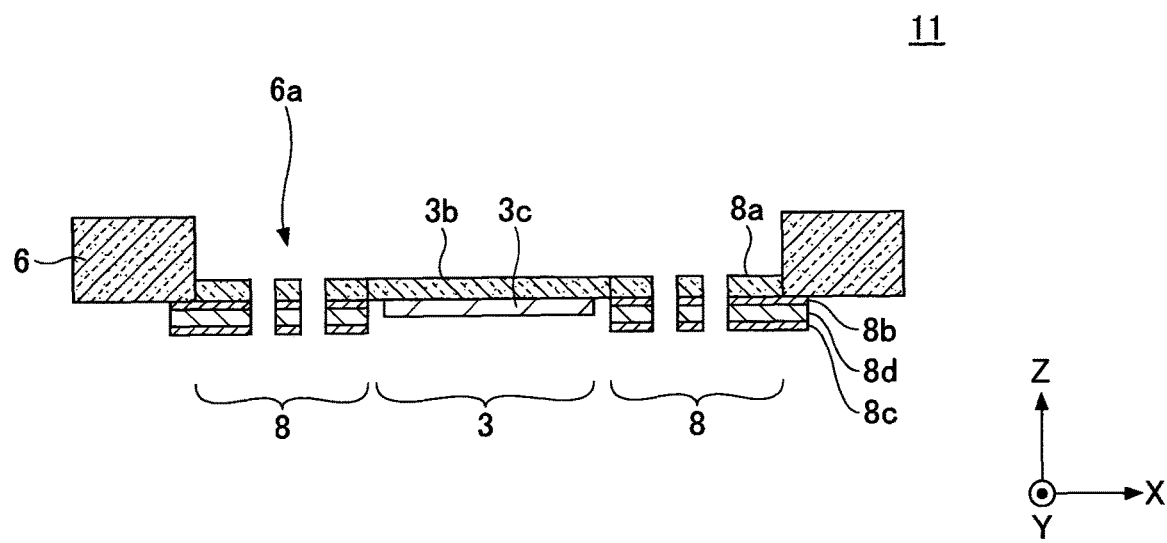
[Fig. 4]
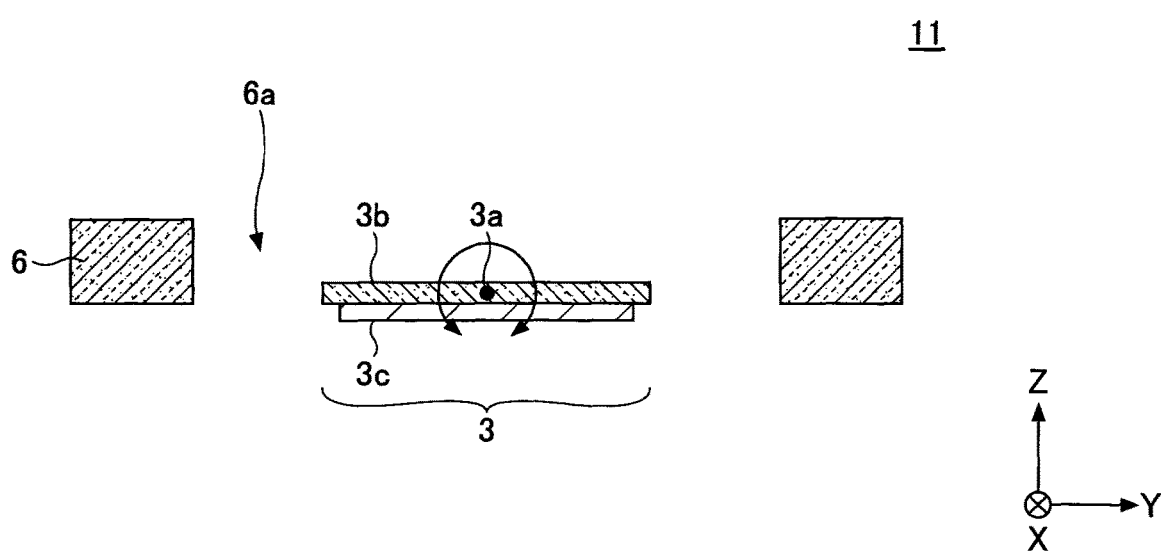

[Fig. 5]
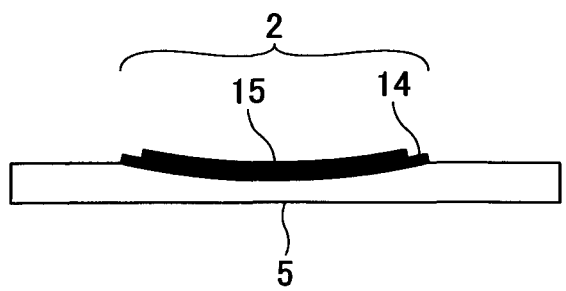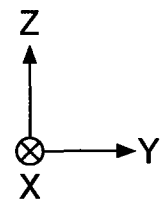
[Fig. 6]
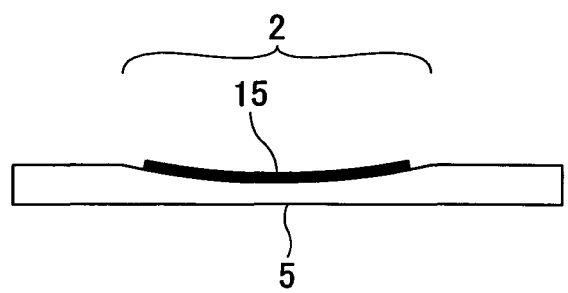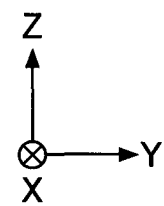
[Fig. 7]
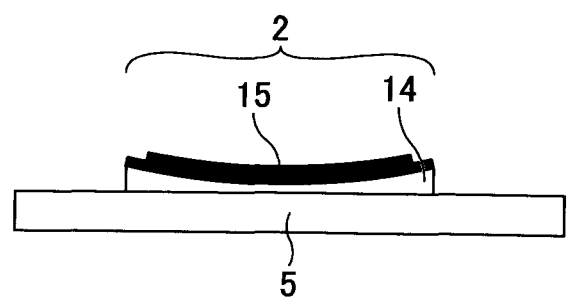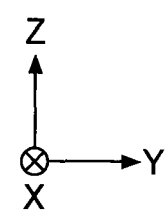

[Fig. 8]
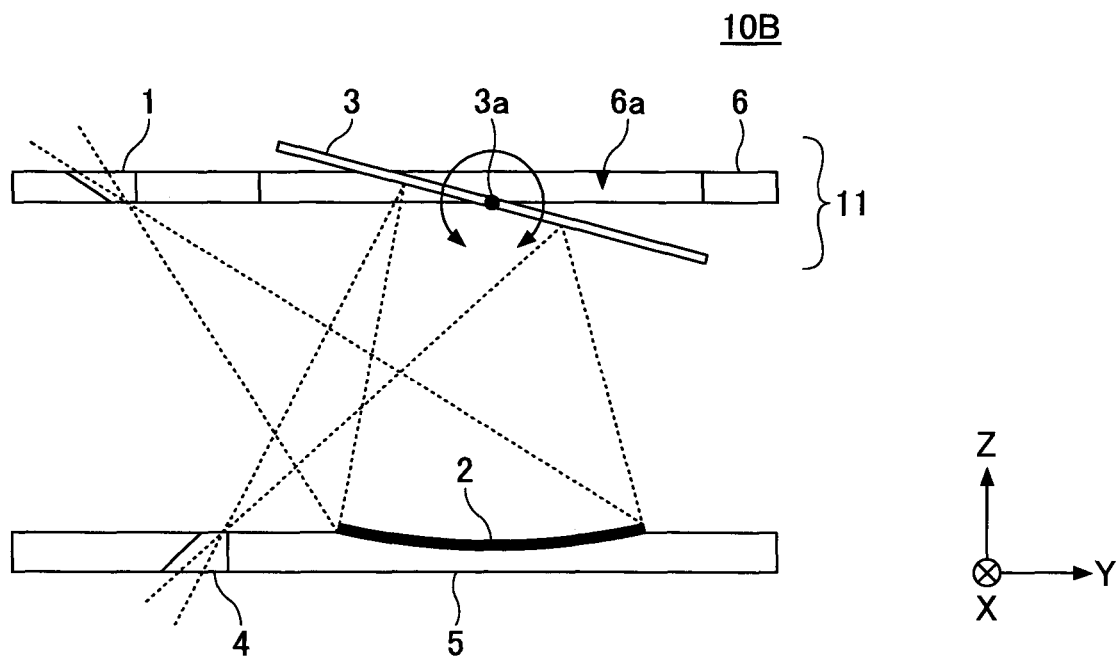
[Fig. 9]
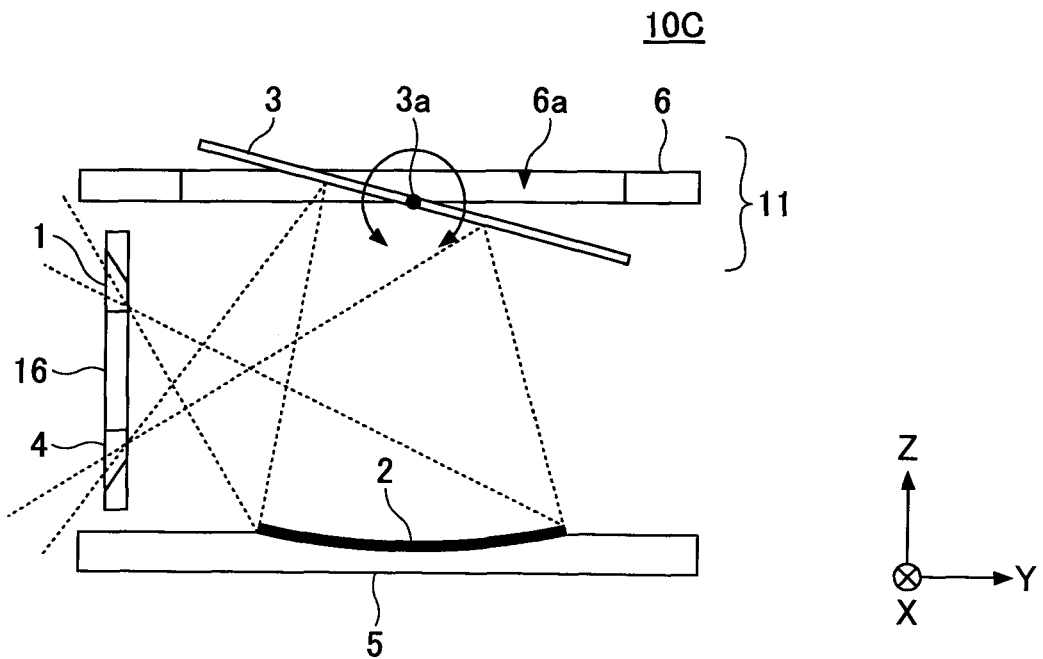

[Fig. 10]
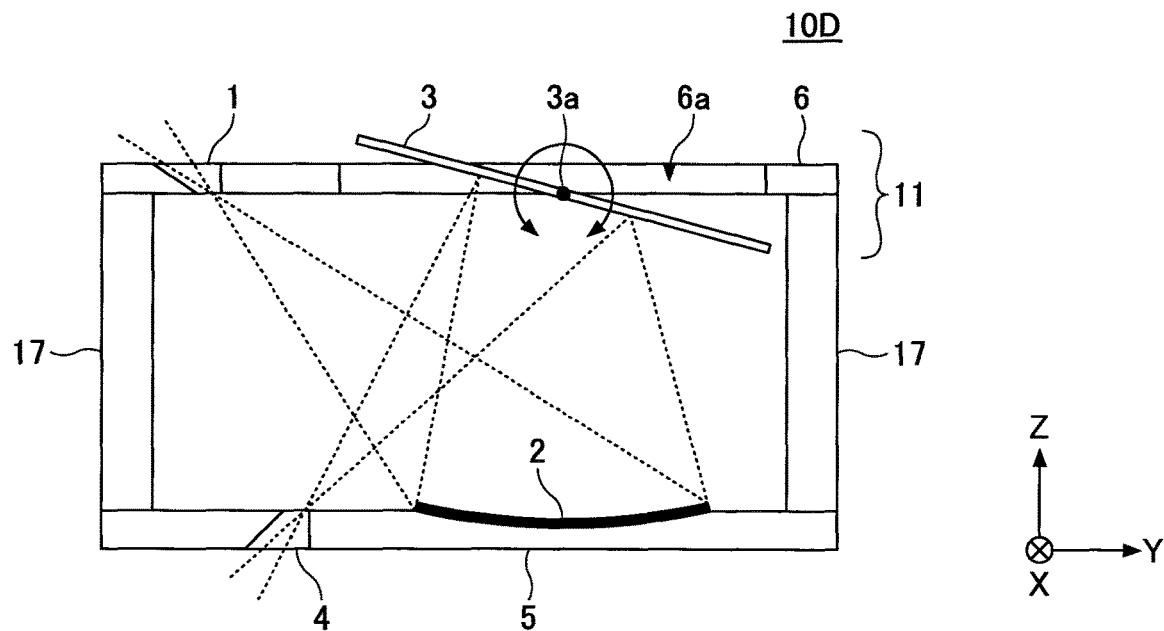
[Fig. 11]
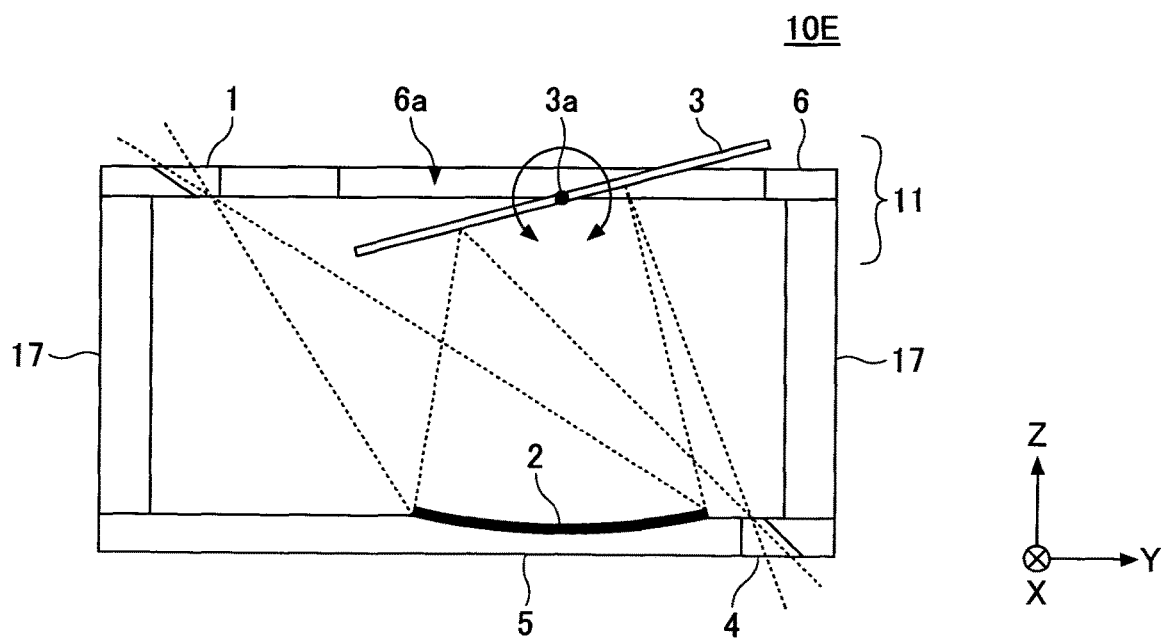

[Fig. 12]
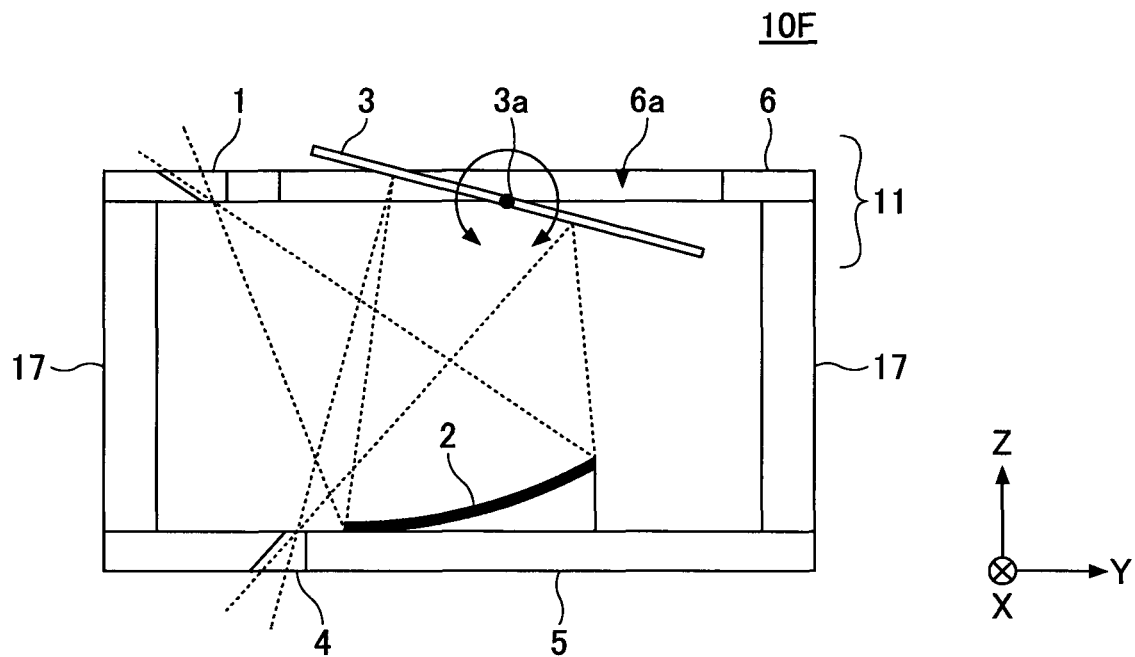
[Fig. 13]
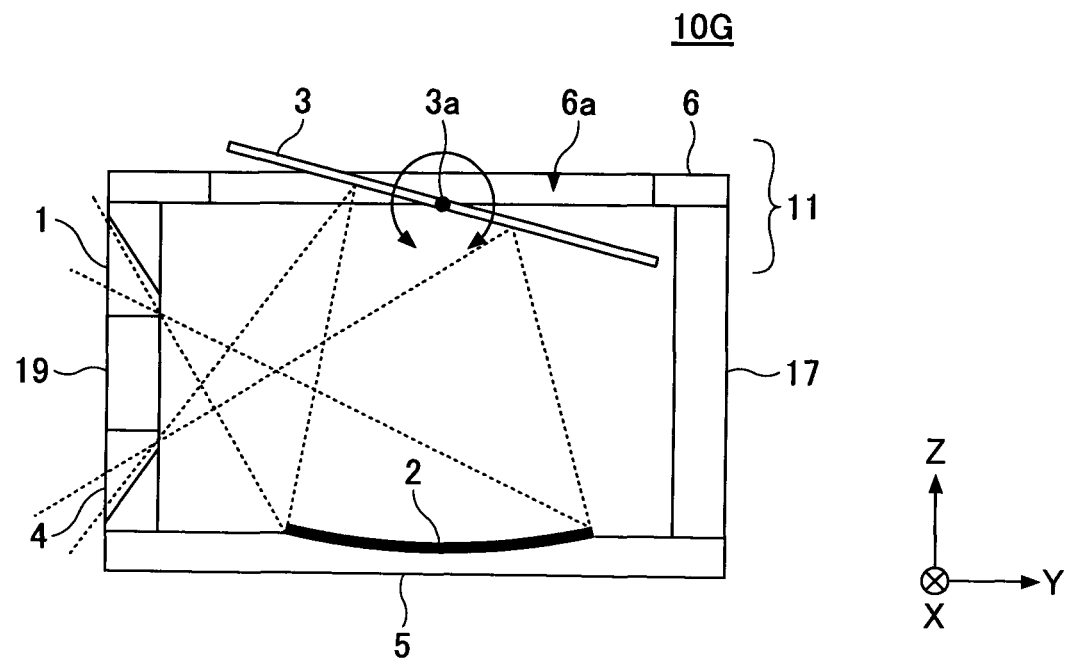

[Fig. 14]
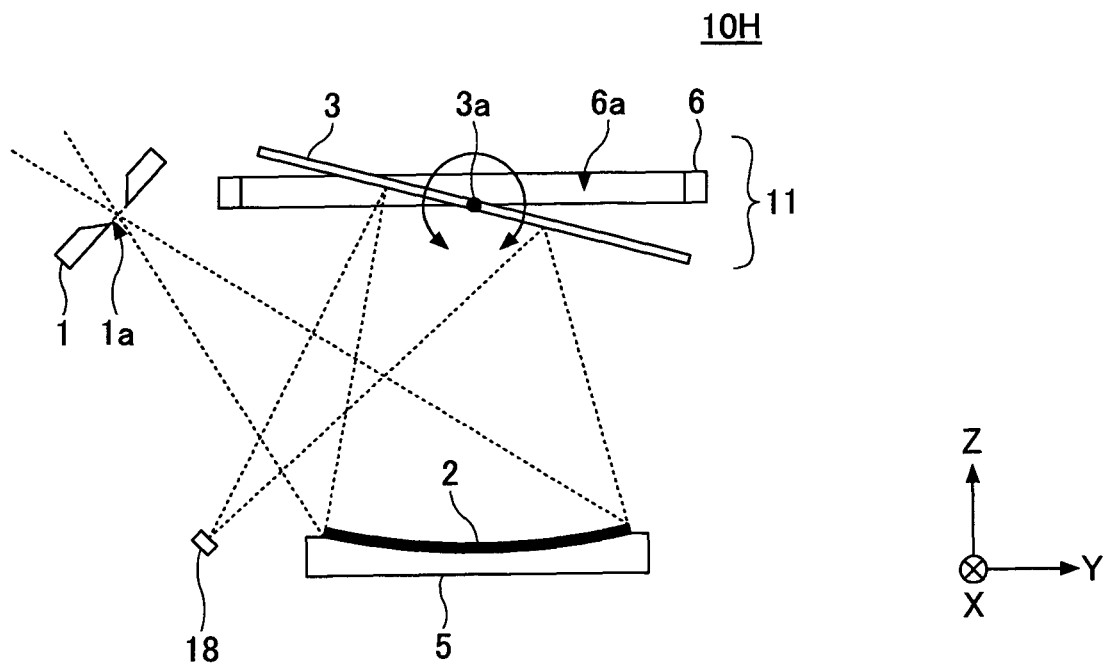
[Fig. 15]
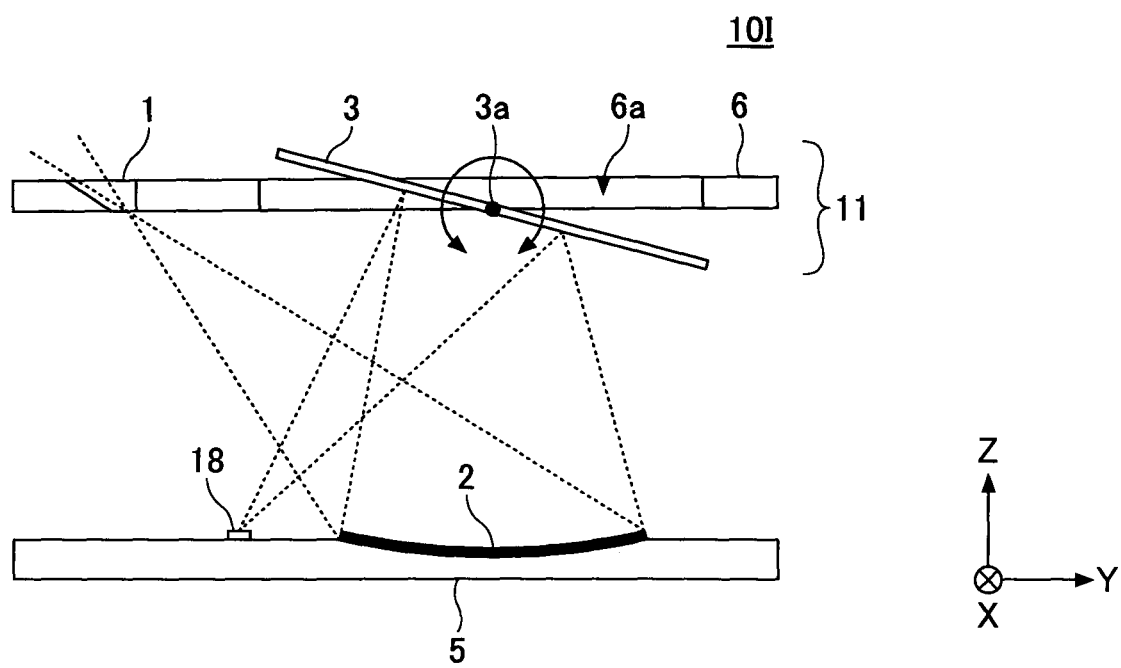

[Fig. 16]
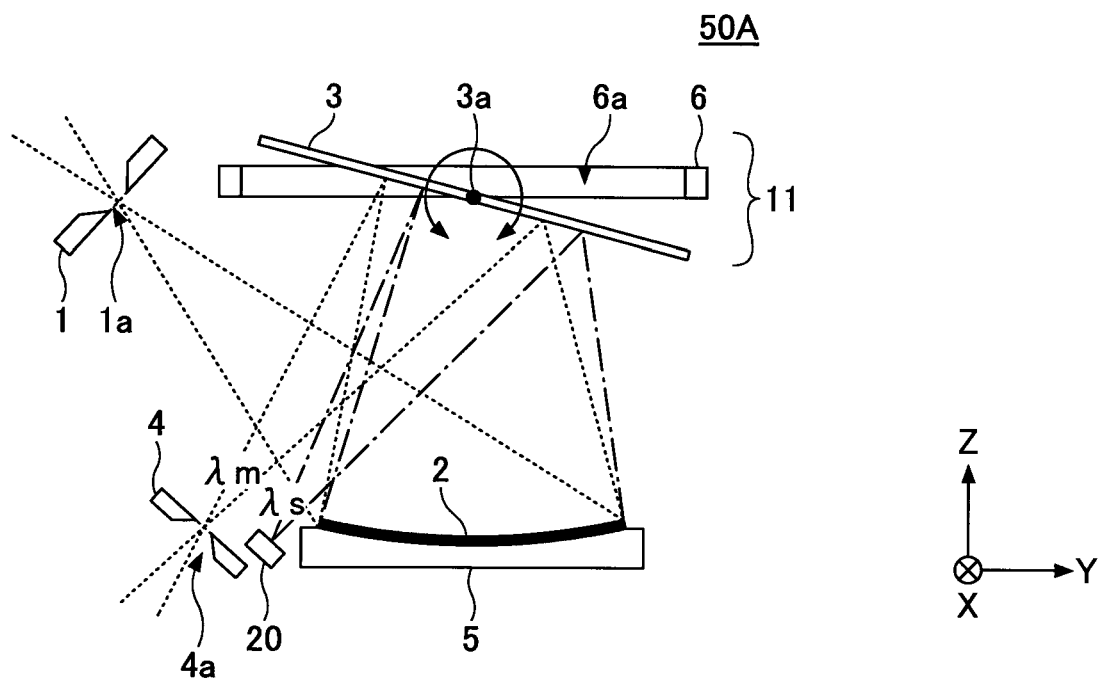
[Fig. 17]
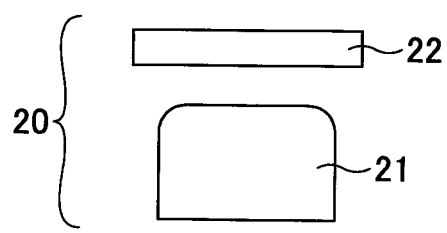

[Fig. 18]
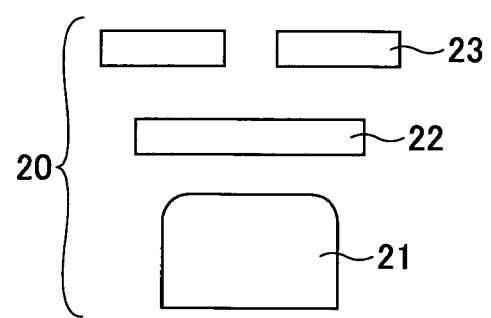

[Fig. 19]
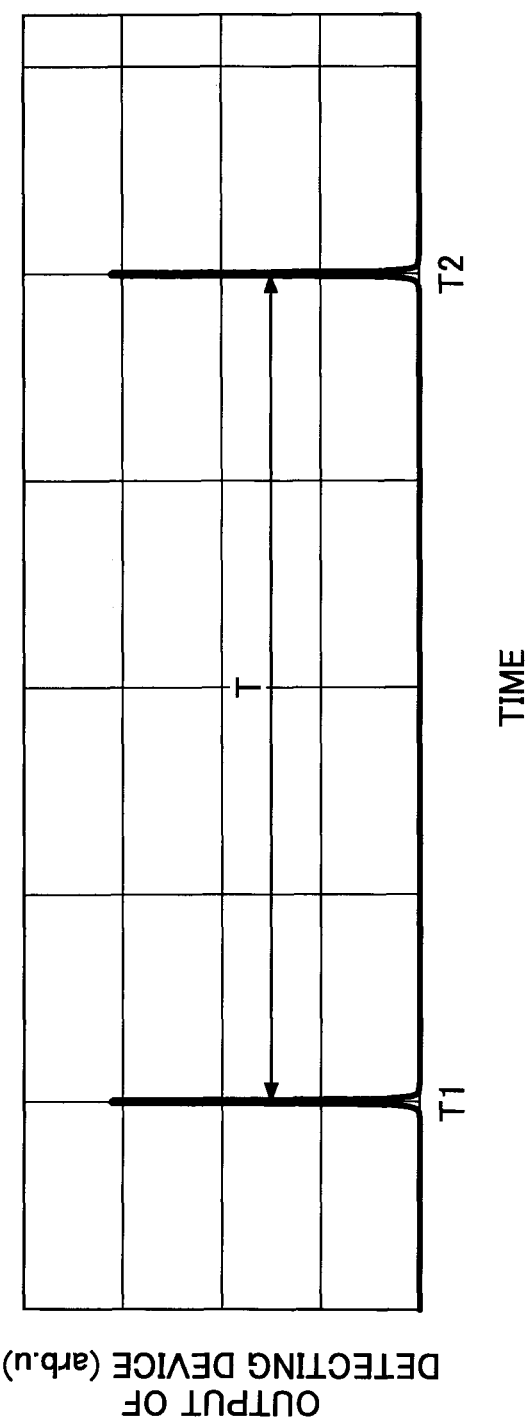

[Fig. 20]
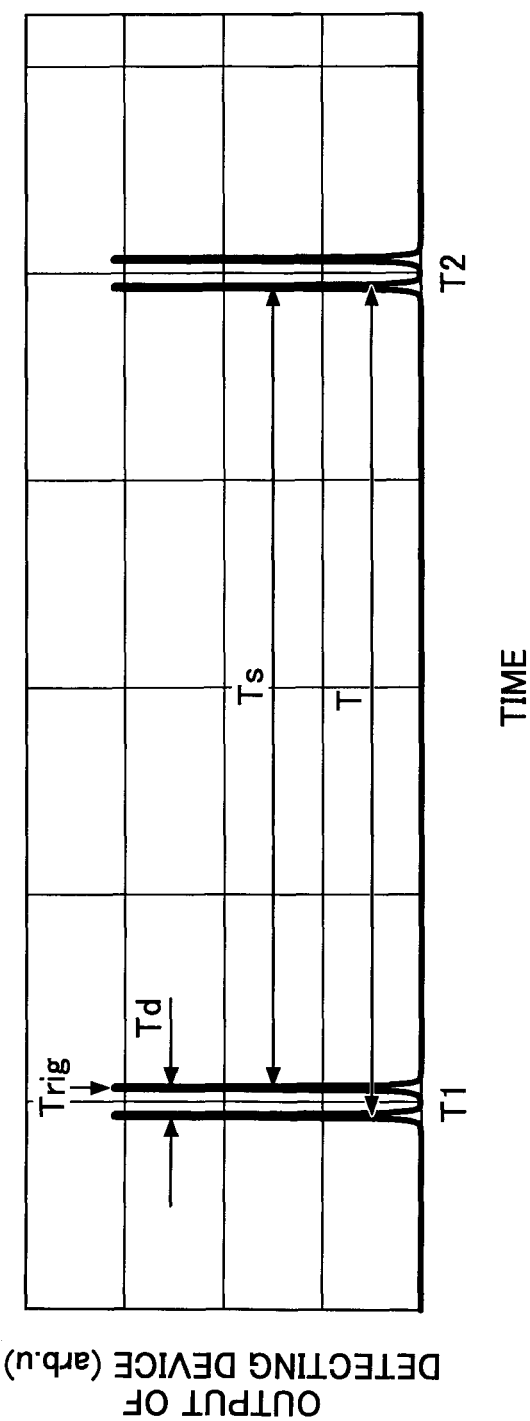

[Fig. 21]
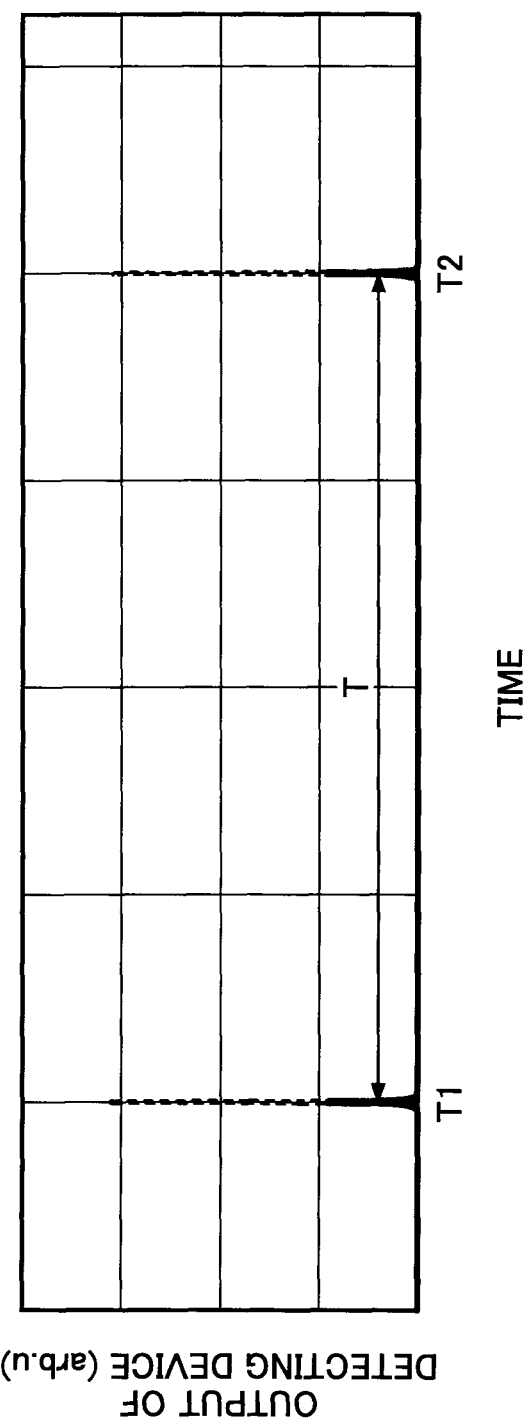

[Fig. 22]
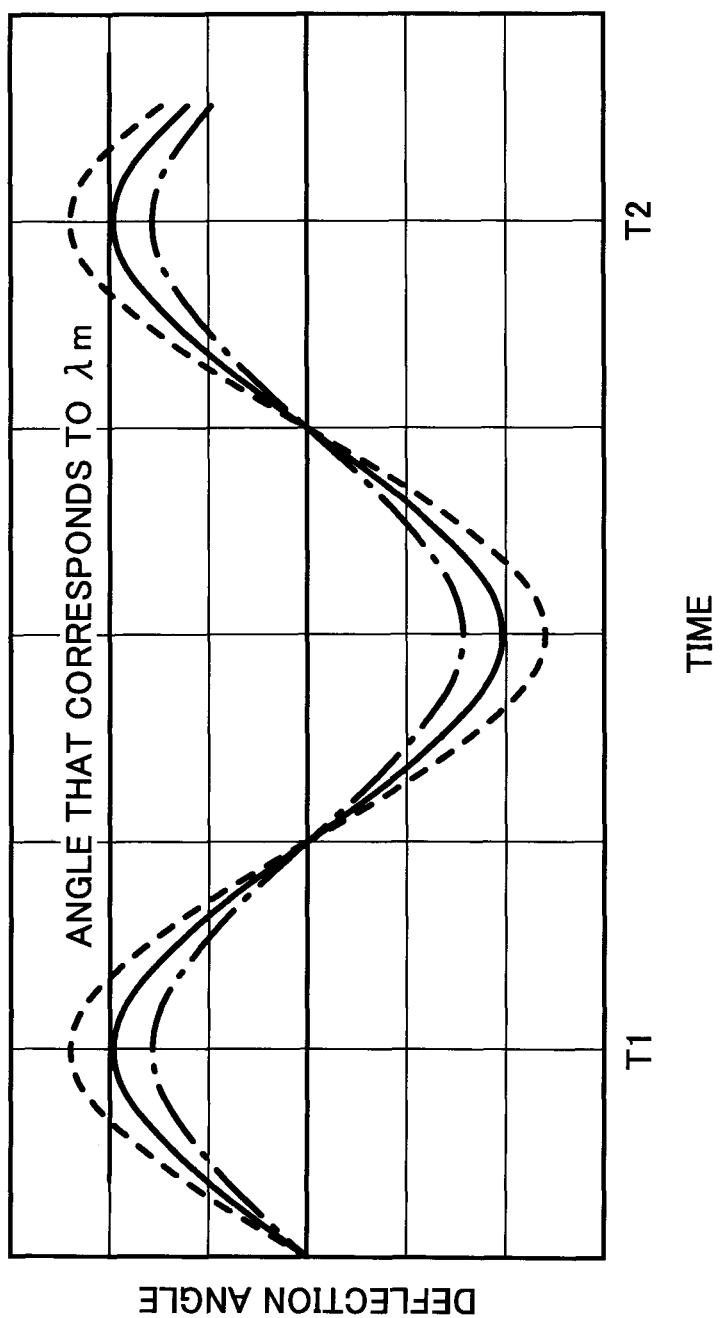

[Fig. 23]
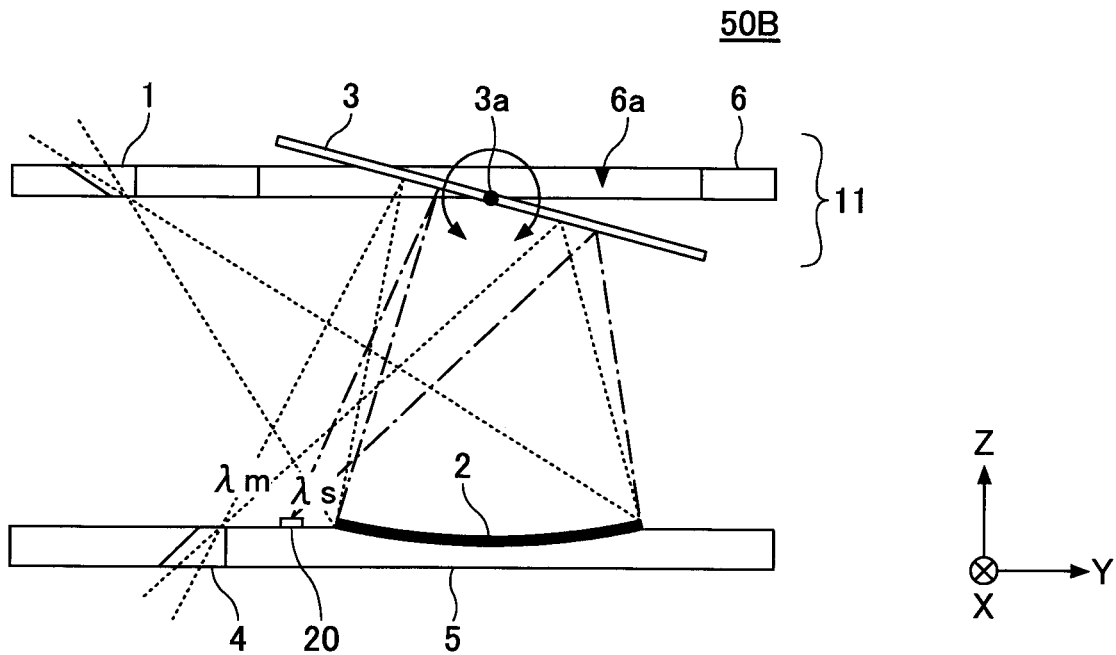
[Fig. 24]
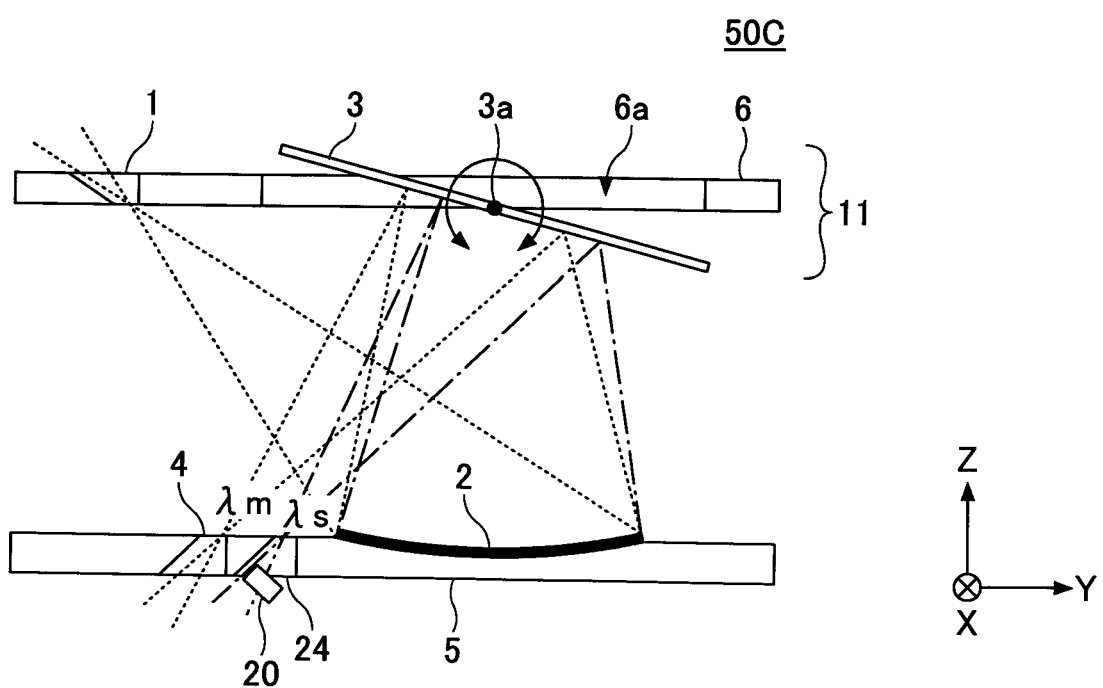

[Fig. 25]
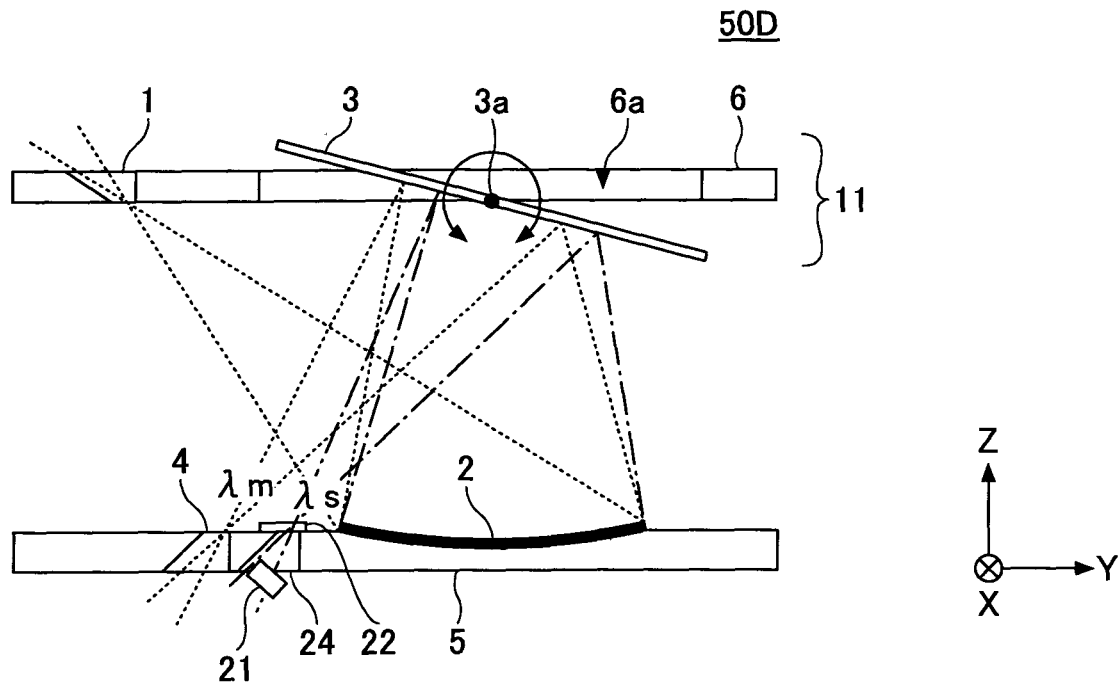
[Fig. 26]
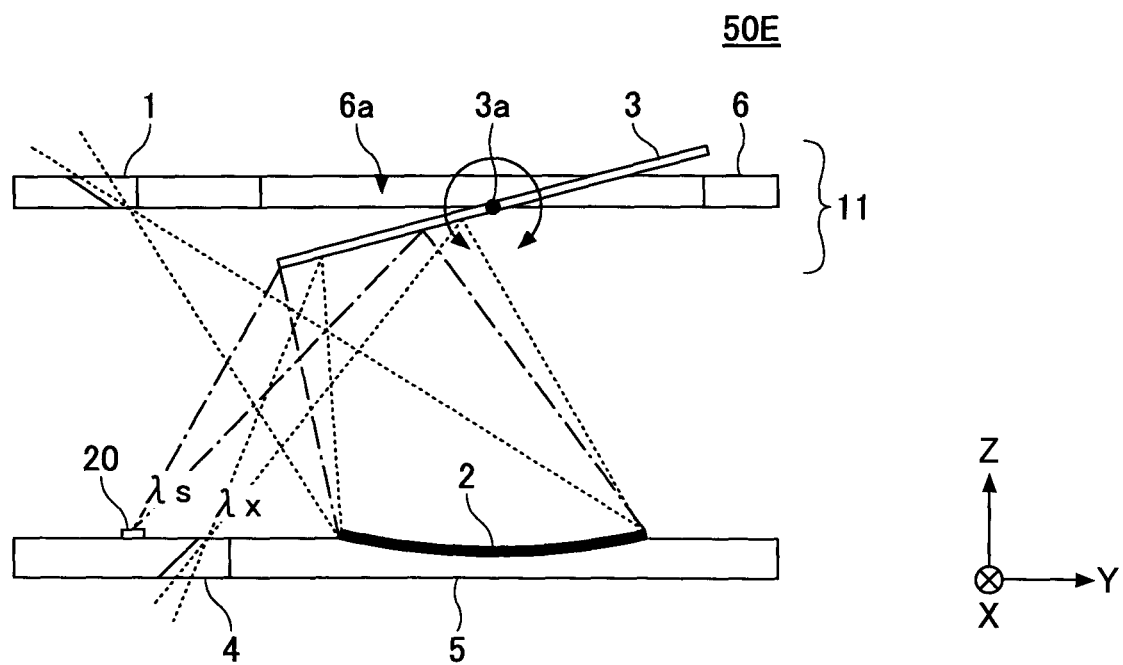

[Fig. 27]
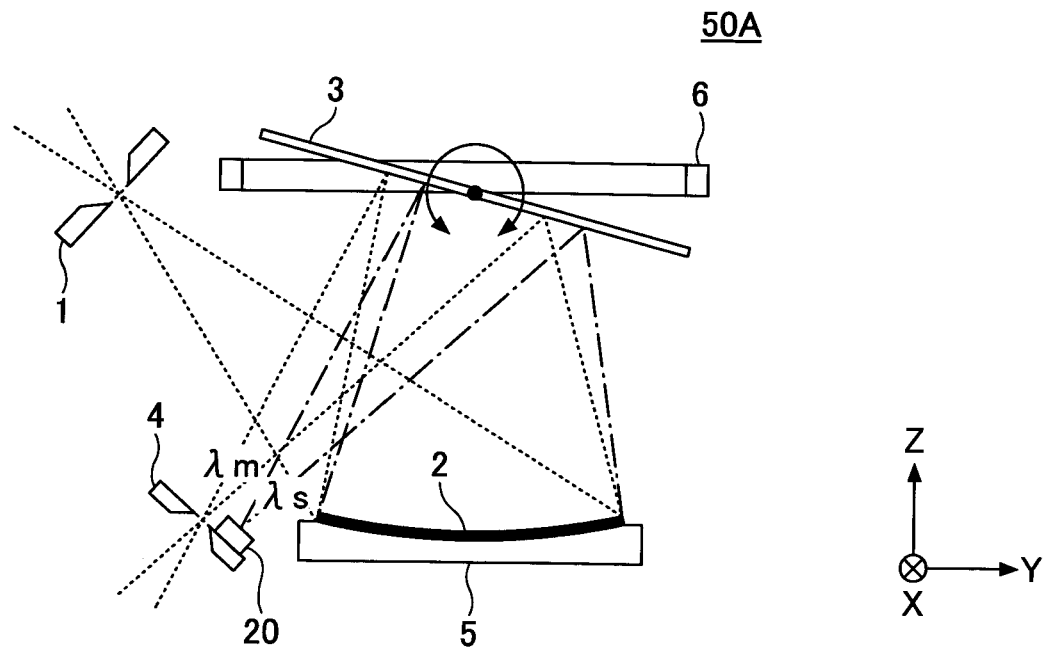
[Fig. 28]
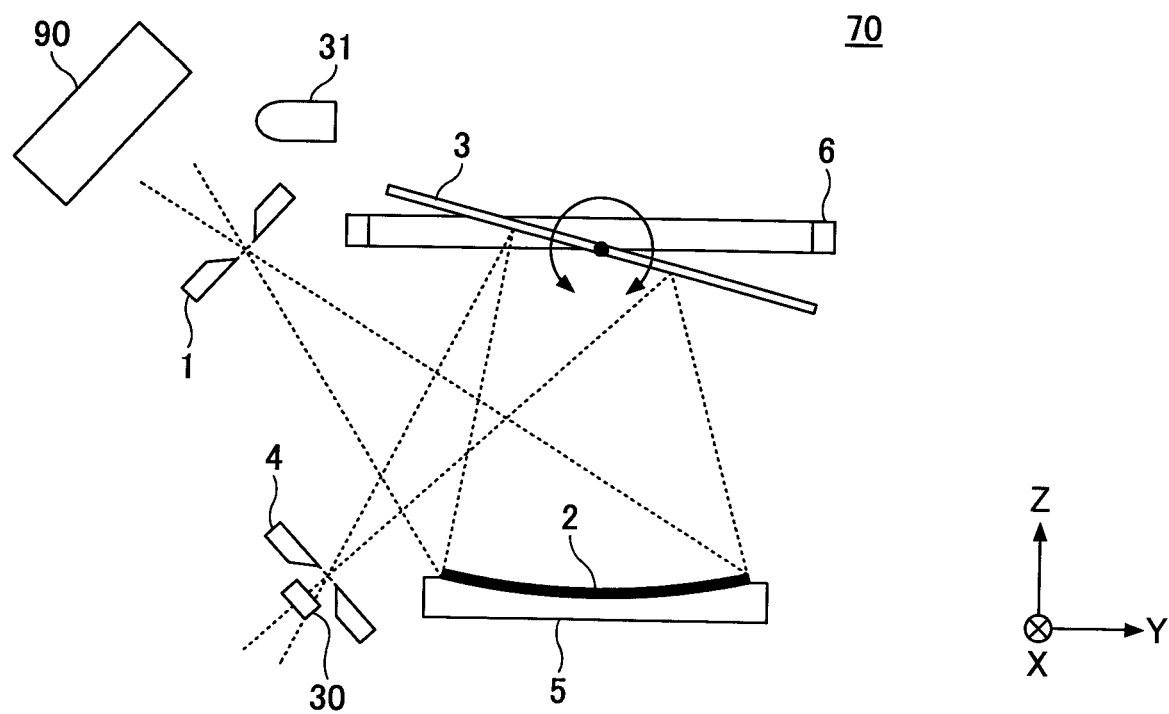

SPECTROMETER, ANALYSIS EQUIPMENT, AND WAVELENGTH-VARIABLE LIGHT SOURCE

TECHNICAL FIELD

The present invention relates to a spectrometer, an analysis equipment, and a wavelength-variable light source.

BACKGROUND ART

What is called a spectrometer, which is for dispersing light of measurement on a wavelength basis, so as to obtain a spectroscopic spectrum of each of the wavelengths, is conventionally known in the art.

Note that a general spectrometer is configured with a concave diffraction grating for dispersing incident light of measurement into light with multiple wavelengths and with an array sensor that is capable of detecting each of the light with the multiple wavelengths (see PLT 1 as shown below, for example). For example, a silicon (Si) photodiode, an InGaAs (indium gallium arsenide) photodiode, etc., may be employed for an array sensor.

CITATION LIST

Patent Literature

[PLT 1] Japanese Unexamined Patent Application Publication No. 2015-148485

SUMMARY OF INVENTION

Technical Problem

However, conventionally, there has been an issue that a small-scale and inexpensive spectrometer cannot be provided because an array sensor employed for a spectrometer is large-scale and expensive.

As a solution to the above-described issue relating to the conventional technique, the object of the present invention is to enable to provide a small-scale and inexpensive spectrometer.

Solution to Problem

As a solution to the above-described issue, one aspect of the present invention provides a spectrometer including: a light incidence unit configured to allow incidence of light from outside; a diffraction grating configured to disperse, according to wavelength, the light that is incident through the light incidence unit; and a reflection unit including a reflection surface for reflecting the light that has been dispersed according to wavelength by the diffraction grating. Tilt of the reflection surface is changeable.

Advantageous Effects of Invention

According to the present invention, a small-scale and inexpensive spectrometer can be provided.

BRIEF DESCRIPTION OF DRAWINGS

FIG. 1 is a conceptual view illustrating a configuration of a spectrometer according to a first embodiment of the present invention;

FIG. 2 is a schematic view of a configuration of a light reflection unit according to the first embodiment of the present invention;

FIG. 3 is a cross sectional view taken along Line A-A' of the light reflection unit illustrated in FIG. 2;

FIG. 4 is a cross sectional view taken along Line B-B' of the light reflection unit illustrated in FIG. 2;

FIG. 5 is a schematic view illustrating a first configuration example of a concave diffraction grating according to the first embodiment of the present invention;

FIG. 6 is a schematic view illustrating a second configuration example of the concave diffraction grating according to the first embodiment of the present invention;

FIG. 7 is a schematic view illustrating a third configuration example of the concave diffraction grating according to the first embodiment of the present invention;

FIG. 8 is a conceptual view illustrating a first variation example of a configuration of the spectrometer according the first embodiment of the present invention;

FIG. 9 is a conceptual view illustrating a second variation example of a configuration of the spectrometer according to the first embodiment of the present invention;

FIG. 10 is a conceptual view illustrating a third variation example of a configuration of the spectrometer according to the first embodiment of the present invention;

FIG. 11 is a conceptual view illustrating a fourth variation example of a configuration of the spectrometer according to the first embodiment of the present invention;

FIG. 12 is a conceptual view illustrating a fifth variation example of a configuration of the spectrometer according to the first embodiment of the present invention;

FIG. 13 is a conceptual view illustrating a sixth variation example of a configuration of the spectrometer according to the first embodiment of the present invention;

FIG. 14 is a conceptual view illustrating a seventh variation example of a configuration of the spectrometer according to the first embodiment of the present invention;

FIG. 15 is a conceptual view illustrating an eighth variation example of a configuration of the spectrometer according to the first embodiment of the present invention;

FIG. 16 is a conceptual view illustrating a configuration of a spectrometer according to a second embodiment of the present invention;

FIG. 17 is a conceptual view illustrating a configuration (i.e., a first example) of a specific wavelength detecting device according to the second embodiment of the present invention;

FIG. 18 is a conceptual view illustrating a configuration (i.e., a second example) of the specific wavelength detecting device according to the second embodiment of the present invention;

FIG. 19 is a drawing illustrating an example of an output signal of the specific wavelength detecting device according to the second embodiment of the present invention;

FIG. 20 is a drawing illustrating an example of an output signal of the specific wavelength detecting device according to the second embodiment of the present invention;

FIG. 21 is a drawing illustrating an example of an output signal of the specific wavelength detecting device according to the second embodiment of the present invention;

FIG. 22 is a drawing illustrating an example of a time waveform for deflection angle of a movable light reflection part according to the second embodiment of the present invention;

FIG. 23 is a conceptual view illustrating a first variation example of a configuration of the spectrometer according to the second embodiment of the present invention;

FIG. 24 is a conceptual view illustrating a second variation example of a configuration of the spectrometer according to the second embodiment of the present invention;

FIG. 25 is a conceptual view illustrating a third variation example of a configuration of the spectrometer according to the second embodiment of the present invention;

FIG. 26 is a conceptual view illustrating a fourth variation example of a configuration of the spectrometer according to the second embodiment of the present invention;

FIG. 27 is a conceptual view illustrating another configuration of the spectrometer according to the second embodiment of the present invention; and FIG. 28 is a conceptual view illustrating a configuration of a spectroscopic measurement apparatus by use of the spectrometer according to the first embodiment of the present invention.

DESCRIPTION OF EMBODIMENTS

First Embodiment

The following description explains the first embodiment of the present invention, with reference to the accompanying drawings.

(Configuration of a Spectrometer 10A)

FIG. 1 is a conceptual view illustrating a configuration of a spectrometer 10A according to the first embodiment of the present invention. The spectrometer 10A illustrated in FIG. 1 is an example of a "spectrometer" in the present invention. The spectrometer 10A is configured with a light incidence part 1, a concave diffraction grating 2, a movable light reflection part 3, a light output part 4, a substrate 5, and a substrate 6.

The light incidence part 1 is an example of a "light incidence unit" in the present invention. The light incidence part 1 includes a light passage part 1a. The light incidence part 1 allows externally emitted light to pass through the light passage part 1a, such that the light is incident to the spectrometer 10A. The light passage part 1a is, for example, in a pinhole-shape, a slit-shape, etc. The light incidence part 1 is provided for the purpose of deciding an incidence position of light, improving wavelength resolution, etc.

The concave diffraction grating 2 is an example of a "diffraction grating" in the present invention. The concave diffraction grating 2 is formed on the substrate 5. The concave diffraction grating 2 causes wavelength dispersion of light that is incident to the spectrometer 10A from the light incidence part 1. The light (i.e., diffracted light) on which wavelength dispersion is performed by the concave diffraction grating 2 is reflected towards the movable light reflection part 3. Material for the substrate 5 may be, for example, semiconductor, glass, metal, resin, etc., but is not limited to such material. Note that the concave diffraction grating 2 may be formed directly on the substrate 5 and may be formed on a thin film layer (e.g., a resin layer, etc.) formed on the substrate 5.

The movable light reflection part 3 is an example of a "reflection unit" in the present embodiment. The movable light reflection part 3 is arranged inside an opening part 6a of the substrate 6 in the same plane of the substrate 6. Together with the substrate 6, the movable light reflection part 3 configures a light reflection unit 11. The movable light reflection part 3 reflects diffracted light, which has been dispersed by the concave diffraction grating 2, towards the light output part 4. The movable light reflection part 3 includes a rotation axis 3a. The movable light reflection part 3 is configured to rotate on the rotation axis 3a, such that tilt of the reflection surface for reflecting diffracted light can be changed. Material for the substrate 6 may be, for example, semiconductor, glass, metal, resin, etc., but is not limited to such material. However, in a case of using semiconductor as material for the substrate 6, an extremely thin and small-scale movable light reflection part 3 can be formed, by means of a semiconductor process, a microelectromechanical system (MEMS) process, etc. Furthermore, in the case of using semiconductor as material for the substrate 6, a driving element by means of piezoelectric actuation, electrostatic actuation, electromagnetic actuation, etc., can be monolithically formed on the substrate 6. Therefore, the spectrometer 10A can be down-scaled because the movable light reflection part 3 can be driven without an external driving device such as a motor.

The light output part 4 is an example of a "light output unit" in the present invention. The light output part 4 includes a light passage part 4a. The light output part 4 allows diffracted light that has been reflected by the movable light reflection part 3 to pass through the light passage part 4a at a focal point, such that the diffracted light is externally output. The light passage part 4a is, for example, in a pinhole-shape, a slit-shape, etc. The light output part 4 is provided for the purpose of deciding an output position of diffracted light, improving wavelength resolution, etc.

Note that each of the light incidence part 1 and the light output part 4 may be formed on a substrate. In the above case, material for the substrates may be, for example, semiconductor, glass, metal, resin, etc., but is not limited to such material. However, in a case of using semiconductor as material for the substrates, the light incidence part 1 and the light output part 4 can be formed with a high degree of accuracy and at a low cost, by means of a semiconductor process, an MEMS process, etc.

Additionally, in the spectrometer 10A, each of the above-described constituent elements is arranged at a predetermined position and fixed to the structure, supports, etc., to maintain a predetermined angle, as illustrated in FIG. 1.

(Configuration of the Light Reflection Unit 11)

The following description explains a specific configuration of the light reflection unit 11, with reference to FIGS. 2 through 4. FIG. 2 is a schematic view of a configuration of the light reflection unit 11 according to the first embodiment of the present invention. As illustrated in FIG. 2, the light reflection unit 11 is configured with a movable light reflection part 3, a substrate 6, a driving circuit 7 (i.e. an example of a "driving unit" in the present invention), and a beam part 8. The movable light reflection part 3 is arranged inside an opening part 6a of the substrate 6 in the same plane of the substrate 6. The opening part 6a is formed by means of a MEMS process such as an isotropic deep etching. The movable light reflection part 3 is supported by the beam part 8 with respect to both an end part of the rotation axis 3a and the other end part of the rotation axis 3a.

Furthermore, in the example of FIG. 2, the movable light reflection part 3 is configured with a thin film part 3b and a reflection member 3c, which is superimposed on a reflection surface of the thin film part 3b. The reflection member 3c is provided for the purpose of improving the reflection rate of the movable light reflection part 3. As the thin film part 3b, a thin film silicon (Si) layer on a silicon-on-insulator (SOI) substrate, etc., may be employed, for example. Furthermore, as the reflection member 3c, metal material such as aluminum (Al), silver (Ag), gold (Au), or platinum (Pt) may be used, for example.

FIG. 3 is a cross sectional view taken along Line A-A' of the light reflection unit 11 illustrated in FIG. 2. In the example of FIG. 3, the beam part 8 is configured with a thin film part 8a, an electrode 8b, a piezoelectric film 8d, and an electrode 8c, which are superimposed in the said order from top (i.e., the positive direction of Z-axis) to bottom of FIG. 3. Having the above-described configuration, the beam part 8 is able to function as an actuator for driving the movable light reflection part 3 to rotate, when the driving circuit 7 (cf. FIG. 2) applies a voltage to the piezoelectric film 8d via the electrodes 8b and 8c. For example, to externally output diffracted light with a desired wavelength, the movable light reflection part 3 is required to be tilted at a predetermined angle that corresponds to the wavelength. For example, the driving circuit 7 applies a predetermined voltage to the piezoelectric film 8d. Alternatively, the driving circuit 7 applies a voltage to the piezoelectric film 8d, based on a feedback of an angle detected by a tilt sensor, which is provided in the movable light reflection part 3. In the above ways, the movable light reflection part 3 can be tilted at a predetermined angle. Note that, the driving method for the movable light reflection part 3 is not limited to the piezoelectric actuation and may be another driving method such as electrostatic actuation or electromagnetic actuation.

FIG. 4 is a cross sectional view taken along Line B-B' of the light reflection unit 11 illustrated in FIG. 2. As illustrated in FIG. 4, the movable light reflection part 3 is configured to rotate on the rotation axis 3a in the clockwise or counter-clockwise direction when being driven by the beam part 8 as explained with reference to FIG. 3, such that tilt of the reflection surface for reflecting diffracted light can be changed.

(Configuration Examples of the Concave Diffraction Grating 2)

Next, the following description explains specific configurations of the concave diffraction grating 2, with reference to FIGS. 5 through 7.

FIG. 5 is a schematic view illustrating a first configuration example of the concave diffraction grating 2 according to the first embodiment of the present invention. In the example of FIG. 5, the concave diffraction grating 2 is configured with a resin layer 14 and a reflection member 15. Specifically, a concave surface is formed on a top surface of the substrate 5. Further, the resin layer 14, which is in a shape of a thin film, is formed on the concave surface. Furthermore, a diffraction grating is formed on the resin layer 14. Additionally, the reflection member 15 using metal material such as Al, Ag, Au, or Pt is formed on a surface of the diffraction grating for the purpose of improving the reflection rate.

For example, in a case where a Si substrate is employed as the substrate 5, a concave surface can be formed on the substrate 5 by forming a concave-surface-forming pattern on a resist applied on the substrate 5 by means of grayscale masking, nanoimprint technology, etc., and then performing dry-etching, etc. Furthermore, a diffraction grating can be formed on the resin layer 14 by forming the resin layer 14 on the concave surface of the substrate 5 and then transferring a template for a concave diffraction grating, which is prepared in another process, onto the resin layer 14 and curing the resin layer 14.

FIG. 6 is a schematic view illustrating a second configuration example of the concave diffraction grating 2 according to the first embodiment of the present invention. In the example of FIG. 6, the concave diffraction grating 2 is configured with a reflection member 15. Specifically, a concave surface is formed on a top surface of the substrate 5. Further, a diffraction grating is formed on the concave surface. Additionally, the reflection member 15 using metal material such as Al, Ag, Au, or Pt is formed on a surface of the diffraction grating for the purpose of improving the reflection rate. For example, the diffraction grating can be formed on the concave surface of the substrate 5 by applying a resist on the concave surface of the substrate 5, then forming a grating pattern on the resist by means of an interference exposure method, etc., and then performing dry-etching, etc.

FIG. 7 is a schematic view illustrating a third configuration example of the concave diffraction grating 2 according to the first embodiment of the present invention. In the example of FIG. 7, the concave diffraction grating 2 is configured with a resin layer 14 and a reflection member 15. Specifically, a resin layer 14 is formed on a top surface (i.e., a flat surface) of the substrate 5. A concave surface is formed on a top surface of the resin layer 14 and a diffraction grating is formed on the concave surface. Furthermore, a reflection member 15 using metal material such as Al, Ag, Au, or Pt is formed on a surface of the diffraction grating for the purpose of improving the reflection rate. For example, the diffraction grating can be formed on the resin layer 14 by forming the resin layer 14 on the top surface (i.e., the flat surface) of the substrate 5 and then transferring a template for a concave diffraction grating, which is prepared in another process, onto the resin layer 14 and curing the resin layer 14. The process for forming the configuration illustrated in FIG. 7 can be simple because a process for forming a concave surface on the substrate 5 is not necessary.

Note that, regarding each of the concave diffraction gratings 2 as illustrated in FIGS. 5 through 7, the cross section of a groove portion of a diffraction grating may be in a rectangular shape, a sinusoidal shape, a sawtooth-wave shape, etc.

Further, it is possible that each of the concave diffraction gratings 2 as illustrated in FIGS. 5 through 7 may be configured without the reflection member 15. Further, the configuration of a concave diffraction grating 2 is not limited to as illustrated in FIGS. 5 through 7. That is to say, the concave diffraction grating 2 may have a configuration other than as illustrated in FIGS. 5 through 7, as long as the concave diffraction grating 2 has a similar function of wavelength dispersion. Furthermore, in a case where parallel light is incident from the light incidence part 1, a flat concave diffraction grating may be employed, instead of a concave diffraction grating 2, for achieving the similar function of wavelength dispersion. In the above case, a complex device configuration (e.g., a collimating optical system for forming light into parallel light before and after being incident to a flat diffraction grating), which is required in a case of employing a configuration for changing tilt of a flat diffraction grating, is not necessary.

(Function and Effect of a Spectrometer 10A)

A spectrometer 10A according to the present embodiment, which is configured as described above, drives the movable light reflection part 3 to change tilt of the reflection surface of the movable light reflection part 3, such that a wavelength of diffracted light, which is externally output from the light output part 4, can be changed. Specifically, the focal length of diffracted light, on which wavelength dispersion is performed by the concave diffraction grating 2, differs based on each wavelength. Hence, a spectrometer 10A changes tilt of the reflection surface of the movable light reflection part 3, such that the position of the light passage part 4a of the light output part 4 matches a position that corresponds a focal length of diffracted light with a desired wavelength. In the above way, diffracted light with a desired wavelength is output from the light passage part 4a of the light output part 4, as illustrated in FIG. 1. Note that dashed lines of FIG. 1 schematically indicate a light path for light with a specific wavelength. In other words, in FIG. 1, a situation of setting tilt of the reflection surface of the movable light reflection part 3 so as to output diffracted light with a predetermined wavelength is illustrated.

As described above, a spectrometer 10A according to the present invention adjusts tilt of the reflection surface of the movable light reflection part 3, so as to output diffracted light with a desired wavelength through the light passage part 4a of the light output part 4. Therefore, in a case of a spectrometer 10A according to the present embodiment, a spectroscopic spectrum of diffracted light with desired wavelengths can be obtained by an externally-installed single light sensor (i.e., a light detecting unit as described below). In other words, in a case of a spectrometer 10A according to the present invention, a spectroscopic spectrum of diffracted light with various wavelengths can be obtained without an array sensor, which is large-scale and expensive. Therefore, in a case of a spectrometer 10A according to the present embodiment, it is possible to provide a small-scale and inexpensive spectrometer.

Furthermore, in a case of a spectrometer 10A of the present embodiment, diffracted light with a desired wavelength is output through the light passage part 4a of the light output part 4 by changing tilt of the reflection surface of the movable light reflection part 3 without changing tilt of the concave diffraction grating 2. Therefore, in a case of a spectrometer 10A according to the present embodiment, a complex device configuration (e.g., a configuration for accommodating change in the incident angle of light to the concave diffraction grating 2) that is required in a case of employing a configuration for changing tilt of a concave diffraction grating 2 is not necessary. Therefore, in a case of a spectrometer 10A according to the present embodiment, diffracted light with a desired wavelength can be output through the light passage part 4a of the light output part 4 with a relatively simple configuration.

Furthermore, in a case of a spectrometer 10A according to the present embodiment, incident light is reflected twice: reflection by the concave diffraction grating 2 and reflection by the movable light reflection part 3. Therefore, in a case of a spectrometer 10A according to the present embodiment, a configuration can be simplified and decrease in light intensity due to reflection loss can be prevented, in comparison with a configuration such as Japanese Unexamined Patent Application Publication No. 2015-148485, where light is reflected three times or more.

Note that a spectrometer 10A according to the present embodiment may be employed for configuring a spectroscopic measurement apparatus, in combination with at least a light detecting device for detecting diffracted light output through the light passage part 4a of the light output part 4. Here, the light detecting device may be one having a single light sensor. Further, a spectrometer 10A according to the present embodiment may be employed for configuring a monochromator, in combination with at least an optical fiber for guiding diffracted light output through the light passage part 4a of the light output part 4.

(Variation Examples of the Configuration of a Spectrometer)

The following description explains variation examples of the configuration of a spectrometer. Note that, in the following explanation of each variation example, difference from the previously-explained spectrometer is explained. Further, in each variation example, each constituent element having the same function as a previously-explained constituent element is assigned the same reference sign, so as to omit explanation of the previously-explained constituent element. Further, the operational mechanism, etc., of a spectrometer is the same as previously explained, and therefore the explanation is omitted in each variation example.

First Variation Example

FIG. 8 is a conceptual view illustrating a first variation example of a configuration of a spectrometer according to the first embodiment of the present embodiment. With respect to a spectrometer 10B illustrated in FIG. 8, a light incidence part 1 and a movable light reflection part 3 are formed on a single substrate 6. Furthermore, with respect to the spectrometer 10B, a light output part 4 and a concave diffraction grating 2 are formed on a single substrate 5. For example, in a case of employing Si substrates as the substrates 5 and 6, the light incidence part 1 and the light output part 4 are integrally formed on the substrates 6 and 5, respectively, by means of a semiconductor process, an MEMS process, etc.

In a case of the spectrometer 10B, the light incidence part 1 and the light output part 4 can be formed on the substrates 6 and 5, respectively, with a high degree of accuracy by means of a semiconductor process. That is to say, in a case of the spectrometer 10B, adjustment for overall alignment is simplified because adjustment for alignment of the light incidence part 1 and the movable light reflection part 3 and adjustment for alignment between the light output part 4 and the concave diffraction grating 2 are not required. Furthermore, the spectrometer 10B may be configured without any parts of the structure, supports, etc., intervening between the light incidence part 1 and the movable light reflection part 3 and between the light output part 4 and the concave diffraction grating 2. Therefore, in a case of the spectrometer 10B, distances between the light incidence part 1 and the movable light reflection part 3 and between the light output part 4 and the concave diffraction grating 2 can be shorter, and therefore a smaller-scale spectrometer can be achieved.

Second Variation Example

FIG. 9 is a conceptual view illustrating a second variation example of a configuration of a spectrometer according to the first embodiment of the present invention. With respect to a spectrometer 10C illustrated in FIG. 9, a light incidence part 1 and a light output part 4 are formed on a single substrate 16.

In a case of the spectrometer 10C, the light incidence part 1 and the light output part 4 can be formed on the substrate 16 with a high degree of accuracy, by means of a semiconductor process. That is to say, in a case of the spectrometer 10C, adjustment for overall alignment is simplified because adjustment for alignment between the light incidence part 1 and the light output part 4 is not required.

Third Variation Example

FIG. 10 is a conceptual view illustrating a third variation example of a configuration of a spectrometer according to the first embodiment of the present invention. In comparison with the spectrometer 10B illustrated in FIG. 8, a spectrometer 10D illustrated in FIG. 10 has a configuration that further includes a pair of spacers 17, one of which is on the right and the other of which is on the left, between the substrate 5 and the substrate 6. The substrate 5 is an example of a "second substrate" in the present invention. The substrate 6 is an example of a "first substrate" of the present invention. Each of the spacers 17 is an example of an "intervening member" in the present invention. Each of the substrates 5 and 6 is joined to the spacers 17. Each of the spacers 17 may be in a shape of a pole, a plate, etc. The distance between the substrate 5 and the substrate 6 is adjusted by thickness of the spacers 17 into a proper distance for obtaining desired spectroscopic characteristics.

In a case of the spectrometer 10D, the distance between the substrate 5 and the substrate 6 is adjusted by thickness of the spacers 17 into a proper distance for obtaining desired spectroscopic characteristics. Therefore, in a case of the spectrometer 10D, adjustment for alignment between the substrate 5 and the substrate 6 is not required. Note that each of the spacers 17 of the spectrometer 10D may be a substrate. In this case, each of the spacers 17 can be formed with a high degree of accuracy, by means of a semiconductor process. Furthermore, multiple spacers 17 can be formed at once on a wafer with a high degree of accuracy. Therefore, a spectrometer with a small degree of variability and a low cost can be achieved.

Fourth Variation Example

FIG. 11 is a conceptual view illustrating a fourth variation example of a configuration of a spectrometer according to the first embodiment of the present invention. A spectrometer 10E illustrated in FIG. 11 is different from the spectrometer 10D illustrated in FIG. 10 in terms of the point that a light output part 4 is formed on the right (i.e., at a position in the positive direction of Y-axis in FIG. 11) of the concave diffraction grating 2 on the substrate 5. The concave diffraction grating 2 of the spectrometer 10E has a wider grating pitch, comparing with the spectrometer 10D illustrated in FIG. 10. Accordingly, the diffraction angle of the concave diffraction grating 2 is changed, and therefore the position of the light output part 4 of the spectrometer 10E is modified. In a case of the spectrometer 10E, as the concave diffraction grating 2 has a wider grating pitch in comparison with the spectrometer 10D, the concave diffraction grating 2 can be easily manufactured. Therefore, in a case of the spectrometer 10E, a spectrometer with a small degree of manufactural variability and a low cost can be achieved in comparison with a case of the spectrometer 10D.

Fifth Variation Example

FIG. 12 is a conceptual view illustrating a fifth variation example of a configuration of a spectrometer according to the first embodiment of the present invention. A spectrometer 10F illustrated in FIG. 12 is different from the spectrometer 10D illustrated in FIG. 10 in terms of the point that the concave diffraction grating 2 is arranged at an angle with respect to the substrate 5, facing towards the light incidence part 1 (i.e., in the negative direction of the Y-axis in FIG. 12), such that a normal with respect to the center of the concave diffraction grating 2 on the substrate 5 is not at right angle to the substrate surface of the substrate 5.

In a case of the spectrometer 10F, which has the above-described configuration, the incident angle of diffracted light to the movable light reflection part 3 is adjusted through the changed tilt of the concave diffraction grating 2, such that required deflection angles of the movable light reflection part 3 become equal in the positive and the negative direction. Therefore, in a case of the spectrometer 10F, the same range of wavelengths can be measured with smaller deflection angles of the movable light reflection part 3. Accordingly, in a case of the spectrometer 10F, the movable light reflection part 3 can be driven with smaller driving force. Therefore, in a case of the spectrometer 10F, constituent elements (e.g., a driving element, a driving circuit, a power source, etc.) required for driving of the movable light reflection part 3 can be smaller, which enables a smaller-scale spectrometer to be achieved with a lower cost. Furthermore, in a case of a spectrometer 10F, as the amount of turn with respect to the beam part 8 supporting the movable light reflection part 3 is decreased, it is possible to reduce stress imposed on the beam part 8. Therefore, in a case of the spectrometer 10F, stability, reliability, etc., with respect to rotation angle of the movable light reflection part 3 can be improved.

Sixth Variation Example

FIG. 13 is a conceptual view illustrating a sixth variation example of a configuration of a spectrometer according to the first embodiment of the present invention. A spectrometer 10G illustrated in FIG. 13 is different from the spectrometer 10D illustrated in FIG. 10 in terms of the point that a spacer 17 on the left (i.e., at a position in the negative direction of the Y-axis in FIG. 10) is changed to a substrate 19 and that a light incidence part 1 and a light output part 4 are formed on the substrate 19.

The substrate 19 is an example of a "third substrate" in the present invention. The substrate 19 is arranged between the substrate 5 and the substrate 6 such that the substrate 19 is non-parallel and is vertical to the substrate 5 and the substrate 6. Furthermore, each of the substrate 5 and the substrate 6 is joined to the substrate 19. Material for the substrate 19 may be, for example, semiconductor, glass, metal, resin, etc., but is not limited to such material. However, in a case of using semiconductor as material for the substrate 19, an extremely thin and small-scale light incidence part 1 and light output part 4 can be formed by means of a semiconductor process, a MEMS process, etc.

In a case of the spectrometer 10G, the light incidence part 1 and the light output part 4 can be formed on the substrate 19 with a high degree of positional accuracy by means of a semiconductor process. That is to say, in a case of the spectrometer 10G, adjustment for overall alignment is simplified because adjustment for alignment between the light incidence part 1 and the light output part 4 is not required. Note that, with respect to the spectrometer 10G, the light incidence part 1 can be formed on the substrate 6 and the light output part 4 can be formed on the substrate 19. Contrarily, with respect to the spectrometer 10G, the light incidence part 1 can be formed on the substrate 19 and the light output part 4 can be formed on the substrate 5.

Seventh and Eighth Variation Examples

FIG. 14 is a conceptual view illustrating a seventh variation example of a configuration of a spectrometer according to the first embodiment of the present invention. FIG. 15 is a conceptual view illustrating an eighth variation example of a configuration of a spectrometer according to the first embodiment of the present invention. A spectrometer 10H illustrated in FIG. 14 is different from the spectrometer 10A illustrated in FIG. 1 in terms of the point that a light detecting part 18 is provided at the location of the light output part 4, instead of the light output part 4. A spectrometer 10I illustrated in FIG. 15 is different from the spectrometer 10B illustrated in FIG. 8 in terms of the point that a light detecting part 18 is provided at the location of the light output part 4, instead of the light output part 4. The light detecting part 18 of each of the spectrometers 10H and 10I is an example of a "light detecting unit" in the present invention.

In a case of the spectrometer 10H or 10I, a smaller-scale spectrometer can be achieved because there is no need for externally providing the light detecting part 18. Note that a reception surface of the light detecting part 18 may be formed in the same shape (e.g., a pinhole-shape, a slit-shape, etc.) as the light passage part 4a of the light output part 4. Further, the light detecting part 18 may include a light interception member in the same shape as the light output part 4 over the reception surface. The reception surface, the light interception member, etc., may be monolithically formed on a semiconductor substrate by means of a semiconductor process. Accordingly, the light detecting part 18 may be manufactured to be low-profile and small-scale.

Second Embodiment

Next, the following description explains a second embodiment of the present invention, with reference to FIGS. 16 through 27. As the second embodiment, an example of a spectrometer further provided with a specific wavelength detecting device is explained.

(Configuration of a Spectrometer 50A)

FIG. 16 is a conceptual view illustrating a configuration of a spectrometer 50A according to the second embodiment of the present invention. The spectrometer 50A illustrated in FIG. 16 is different from the spectrometer 10A according to the first embodiment (cf. FIG. 1) in terms of being further provided with a specific wavelength detecting device 20.

The specific wavelength detecting device 20 is an example of a "specific wavelength detecting unit" in the present invention. The specific wavelength detecting device 20 is provided near the focal point of output light (i.e., the position of the light output part 4). The specific wavelength detecting device 20 is capable of detecting light with specific wavelength λs and is placed near the light output part 4. The specific wavelength detecting device 20 detects light with specific wavelength λs so as to enable the spectrometer 50A to detect whether the deflection angle range of the movable light reflection part 3 is sufficient for measuring a desired range of wavelengths (λm to λx) or whether the deflection angle range is constant.

For example, in a case of employing an InGaAs photodiode as a light detecting device, the range of wavelengths measured by the spectrometer 50A can be set to 900 to 1700 nm or 900 to 2500 nm. In the above case, the specific wavelength λs may be shorter than 900 nm, which is the minimum wavelength in the measuring range of wavelengths, and may be longer than 1700 nm or 2500 nm, which is the maximum wavelength in the measuring range of wavelengths. Specifically, in a case of setting the specific wavelength λs to be equal to or shorter than around 1000 nm, the above configuration can be achieved with a lower cost because a Si photodiode can be employed.

Note that dashed lines of FIG. 16 schematically indicate a light path for light with the minimum wavelength λm in the measuring range of wavelengths. Furthermore, dashed-dotted lines of FIG. 16 schematically indicate a light path for light with the specific wavelength λs.

(Configuration of the Specific Wavelength Detecting Device 20)

The following description explains a specific configuration of the specific wavelength detecting device 20, with reference to FIGS. 17 and 18. FIG. 17 is a conceptual view illustrating a configuration (i.e., a first example) of a specific wavelength detecting device 20 according to the second embodiment of the present invention. For example, as illustrated in FIG. 17, the specific wavelength detecting device 20 is configured with a light detecting element 21 and a band-pass filter 22. The light detecting element 21 is an example of a "light detector" in the present invention. The light detecting element 21 detects light with specific wavelength λs. As the light detecting element 21, a Si photodiode, and InGaAs photodiode, etc., may be employed. The band-pass filter 22 allows transmission of light with a particular range of wavelengths (including the specific wavelength λs in the range). It is preferable that, as the band-pass filter 22, a filter (e.g., a Fabry-Perot filter, etc.) with a narrow pass-band is employed.

FIG. 18 is a conceptual view illustrating a configuration (i.e., a second example) of a specific wavelength detecting device 20 according to the second embodiment of the present invention. As illustrated in FIG. 18, the specific wavelength detecting device 20 may be further configured with a light interception member 23. The shape and the size of a light transmission part of the light interception member 23 may be properly chosen, based on requirements. Note that, instead of employing a band-pass filter 22, a light interception member 23, and a light detecting element 21, a light detecting element having functions as a bandpass filter and a light interception member may be employed for the specific wavelength detecting device 20. Furthermore, FIG. 27 is a conceptual view illustrating another configuration of the spectrometer 50A according to the second embodiment of the present invention. Similarly to the configuration illustrated in FIG. 27, the specific wavelength detecting device 20 may be integrally formed on the light output part 4. For example, in a case where the light output part 4 is formed out of a Si substrate and where the specific wavelength detecting device 20 is a Si photodiode, the light output part 4 and the specific wavelength detecting device 20 may be formed monolithically. Furthermore, as the band-pass filter 22 can be formed out of a Fabry-Perot filter, etc., by means of a semiconductor process and the light interception member 23 can be formed out of a metal thin film, etc., by means of a semiconductor process, the configuration of the specific wavelength detecting device 20 illustrated in FIG. 18 can be integrally formed on the light output part 4. Furthermore, depending on the shape of the Si photodiode, a similar function may be obtained, even without forming the light interception member 23.

FIGS. 19 through 21 are drawings illustrating an example of an output signal of the specific wavelength detecting device 20 according to the second embodiment of the present invention. In FIGS. 19 through 21, examples of an output signal in a case of detecting light with specific wavelength λs by means of the specific wavelength detecting device 20 are illustrated. In a case where resonance frequency of the movable light reflection part 3 is f, the driving cycle T is 1/f.

FIG. 19 is a drawing illustrating a situation where amplitude of deflection angle of the movable light reflection part 3 conforms to a measuring range of wavelengths (i.e., λm to λx). In such a case as λs=λm, light with the specific wavelength λs is detected at a position of the maximum deflection angle of the movable light reflection part 3. Therefore, the detection signal of the specific wavelength λs is detected once in a cycle T.

FIG. 20 is a drawing illustrating a situation where amplitude of deflection angle of the movable light reflection part 3 is sufficient for a measuring range of wavelengths (i.e., λm to λx). In this case, the detection signal of the specific wavelength λs is detected twice in a cycle T.

FIG. 21 is a drawing illustrating a situation where amplitude of deflection angle of the movable light reflection part 3 is not sufficient for a measuring range of wavelengths (i.e., λm to λx). In this case, amplitude of the detection signal of the specific wavelength λs is decreased. When amplitude of deflection angle of the movable light reflection part 3 is further decreased, the detection signal of the specific wavelength λs is not output.

As a spectrometer is required to maintain a measuring range of wavelengths (i.e., λm to λx) at all times, a situation of FIG. 19 or a situation of FIG. 20, in which amplitude of deflection angle of the movable light reflection part 3 is sufficient, needs to be maintained. Particularly, in the case of FIG. 20, it is possible to detect that amplitude of deflection angle of the movable light reflection part 3 is sufficient without depending on amplitude of the detection signal of the specific wavelength λs, by detecting a time between two peaks, i.e., Td or Ts. Furthermore, by controlling driving of the movable light reflection part 3 such that Td or Ts is kept constant, it is possible to maintain a constant measuring range of wavelengths (i.e., λm to λx). Furthermore, by detecting light output through the light output part 4 in a range of Ts, it is possible to obtain a desired spectroscopic spectrum. Further, in a case where there is possibility that resonance frequency f of the movable light reflection part 3 fluctuates, Td changes with value of f. Therefore, by measuring a cycle T (i.e., 1/f), it is possible to control Td to be constant in relation to resonance frequency f, so as to obtain a desired spectrum.

Note that, as the range of T is a driving range for two-way motion of the movable light reflection part 3, two rounds of spectra are obtained practically. For spectrum data, a half of the obtained data or an average value of the obtained data may be utilized.

FIG. 22 is a drawing illustrating examples of a time waveform for deflection angle of the movable light reflection part 3 according to the second embodiment of the present invention. The solid line in FIG. 22 is indicative of a situation (i.e., the situation of FIG. 19) where deflection angle matches a measuring range of wavelengths and where light with a minimum wavelength λm is output through the light output part 4 at the time of a maximum value of deflection angle. The dashed line in FIG. 22 is indicative of a situation (i.e., the situation of FIG. 20) where deflection angle is larger than the measuring range of wavelengths. In this example, deflection angle exceeds an angle that corresponds to the minimum wavelength λm, for time around a maximum value of deflection angle in the positive direction. Therefore, a specific wavelength λs is detected at a timing of a deflection angle that corresponds to the minimum wavelength λm. Accordingly, as illustrated in FIG. 20, two detection signals are continuously detected in a cycle. The dashed-dotted line in FIG. 22 is indicative of a situation (i.e., the situation of FIG. 21 or a situation where output of a specific wavelength λs is 0) where deflection angle is not sufficient.

Note that a detection result of the specific wavelength detecting device 20 is output to the driving circuit 7 and is utilized for feedback-control of rotation angle of the movable light reflection part 3. In this case, for example, the driving circuit 7 may control a time interval (i.e., Td or Ts) of detection signals of the specific wavelength λs to be constant, such that the movable light reflection part 3 is controlled to have a constant range of rotation angles.

(Variation Examples of a Configuration of a Spectrometer)

The following description explains variation examples of a configuration of a spectrometer. Note that, in the following explanation of each of the variation examples, difference from the previously-explained spectrometers is explained. Furthermore, in each of the variation examples, constituent elements having the same function as a previously-explained constituent element are assigned the same reference sign as the previously-explained constituent element for omitting explanation. Furthermore, the operational mechanism, etc., of a spectrometer is the same as previously explained, and therefore the explanation is omitted in each variation example.

First Variation Example

FIG. 23 is a conceptual view illustrating a first variation example of a configuration of a spectrometer according to the second embodiment of the present invention. A light incidence part 1 and a movable light reflection part 3 of a spectrometer 50B illustrated in FIG. 23 are formed on a single substrate 6. Furthermore, a light output part 4, a concave diffraction grating 2, and a specific wavelength detecting device 20 of the spectrometer 50B are formed on a single substrate 5. For example, in a case of employing Si substrates for the substrates 5 and 6, the light incidence part 1 and the light output part 4 may be integrally formed on the substrate 6 and the substrate 5, respectively, by means of a semiconductor process, a MEMS process, etc.

The specific wavelength detecting device 20 of the spectrometer 50B may include a light detecting element 21 and a band-pass filter 22 (cf. FIG. 17) and may further include a light interception member 23 (cf. FIG. 18). In the former case, the light detecting element 21 and the band-pass filter 22 can be monolithically formed on the substrate 5 because the light detecting element 21 and the band-pass filter 22 can be formed out of a Fabry-Perot filter, etc., by means of a semiconductor process. In the latter case, the light interception member 23 can be also formed integrally with the light detecting element 21 and the band-pass filter 22 because the light interception member 23 can be formed out of a metal thin film, etc., by means of a semiconductor process.

In a case of the spectrometer 50B, which has the above-described configuration, a spectrometer can be smaller-scale because the specific wavelength detecting device 20 can be integrally formed on the substrate 5. Furthermore, in a case of the spectrometer 50B, the positional relation between the light output part 4 and the specific wavelength detecting device 20 can be controlled with a high degree of accuracy by forming the light output part 4 and the specific wavelength detecting device 20 by means of a semiconductor process. Therefore, in a case of the spectrometer 50B, deflection angle of the movable light reflection part 3 can be detected with a high degree of accuracy, so as to stabilize a measuring range of wavelengths.

Second Variation Example

FIG. 24 is a conceptual view illustrating a second variation example of a configuration of a spectrometer according to the second embodiment of the present invention. A spectrometer 50C illustrated in FIG. 24 is different from the spectrometer 50B illustrated in FIG. 23 in terms of the point that a light output part 24 is formed at a focal point of light with specific wavelength λs and that a specific wavelength detecting device 20 is placed externally. The light output part 24 is an example of a "second light output unit" in the present invention. In a case of the spectrometer 50C, which has the above-described configuration, a process for the substrate 5 can be simplified because the specific wavelength detecting device 20 is not formed on the substrate 5. Furthermore, as the light output part 4 and the light output part 24 can be formed on the substrate 5 simultaneously in a single process, the position relation between the light output part 4 and the light output part 24 can be controlled with a high degree of accuracy. Therefore, in a case of the spectrometer 50C, deflection angle of the movable light reflection part 3 can be accurately detected, so as to stabilize a measuring range of wavelengths.

Third Variation Example

FIG. 25 is a conceptual view illustrating a third variation example of a configuration of a spectrometer according to the second embodiment of the present invention. A spectrometer 50D illustrated in FIG. 25 is different from the spectrometer 50C illustrated in FIG. 24 in terms of the point that a light detecting element 21 and a band-pass filter 22, which are constituent elements of a specific wavelength detecting device 20, are placed separately. Specifically, the band-pass filter 22 is placed on a substrate 5 so as to cover a light output part 24. Further, the light detecting element 21 is placed externally. In a case of the spectrometer 50C, which has the above-described configuration, a spectrometer can be smaller-scale because only a light detecting element 21 is placed externally, in comparison with a configuration in which a band-pass filter 22 is externally placed as well.

Fourth Variation Example

FIG. 26 is a conceptual view illustrating a fourth variation example of a configuration of a spectrometer according to the second embodiment of the present invention. A spectrometer 50E illustrated in FIG. 26 is different from the spectrometer 50B illustrated in FIG. 23 in terms of the point that a specific wavelength detecting device 20 is arranged on the left (i.e., in the negative direction of the Y-axis in FIG. 26) of the light output part 4 on the substrate 5. The positional change is made in association with setting the specific wavelength $\lambda s$ to be longer than the maximum wavelength $\lambda x$ in the measuring range of wavelengths. That is to say, the specific wavelength detecting device 20 is placed at a position where light with the specific wavelength $\lambda s$ focuses when light with the maximum wavelength $\lambda x$ passes the light output part 4.

Particularly, in a case where the maximum wavelength $\lambda x$ in the measuring range of wavelengths is equal to or shorter than 2000 nm, there may be a configuration in which higher-order diffracted light with specific wavelength $\lambda s'$ is detected at the focal point of light with the specific wavelength $\lambda s$. Although $\lambda m$, $\lambda x$, and $\lambda s$ as explained above are first-order diffracted light, there is superimposition of second-order diffracted light at half wavelength for each position of the first-order diffracted light, according to the principle of diffraction. For example, in a case where the specific wavelength $\lambda s$ with respect to first-order diffracted light is 2000 nm, there is second-order diffracted light with a wavelength of 1000 nm (i.e., $\lambda s' = \lambda s/2$) that focuses at the same position of the focal point of the first-order diffracted light. Therefore, as a less expensive Si photodiode can be employed in a case of detecting second-order diffracted light with wavelength $\lambda s'$, cost-saving is possible.

Note that the specific wavelength detecting device 20 explained in the second embodiment may be applied to all of the spectrometers 10A through 10I explained in the first embodiment.

Furthermore, a spectrometer explained in each of the embodiments may be employed, together with a light source, to configure an analysis equipment. For example, in the analysis equipment, light of measurement is emitted by the light source towards a measurement object. Then, the light of measurement that is diffused and reflected by the measurement object is dispersed by a spectrometer, on a wavelength basis, so as to detect the light of measurement with each wavelength. In this way, the analysis equipment is capable of obtaining a spectroscopic spectrum of each wavelength, which is characteristic depending on molecular structure of the measurement object. Furthermore, a spectrometer explained in each of the embodiments may be employed, together with a light source, to configure a wavelength-variable light source. An analysis equipment and a wavelength-variable light source using a spectrometer according to each of the embodiments as described above can be achieved in a smaller scale and with a lower cost, as the spectrometer is small-scale and inexpensive.

FIG. 28 is a conceptual view illustrating a configuration of a spectroscopic measurement apparatus 70 by use of a spectrometer 10A according to the first embodiment of the present invention. The spectroscopic measurement apparatus 70 illustrated in FIG. 28 is configured with the spectrometer 10A illustrated in FIG. 1, a light detecting device 30 placed outside of the light output part 4, and a light source 31. In the spectroscopic measurement apparatus 70, light is emitted by the light source 31 towards a measurement object 90, and then light reflected by the measurement object 90 is incident from the light incidence part 1 to the spectrometer 10A. Light diffracted by the concave diffraction grating 2 is reflected by the movable light reflection part 3 and then, after being output through the light output part 4 in accordance with tilt of the movable light reflection part 3, is detected by the light detecting device 30. In the above way, the spectroscopic measurement apparatus 70 is capable of obtaining an absorption spectroscopy spectrum of the measurement object 90. Note that the detail of the operational mechanism in the spectroscopic measurement apparatus 70 is the same as previously explained, and therefore the explanation is omitted here.

The above describes favorable embodiments of the present invention. However, the present invention is not limited to the embodiments, and various variations and modifications may be made without departing from the scope of the present invention.

The present application is based on Japanese priority application No. 2017-008806 filed on Jan. 20, 2017, with the Japanese Patent Office, and Japanese priority application No. 2017-178919 filed on Sep. 19, 2017, with the Japanese Patent Office, the entire contents of which are hereby incorporated by reference.

REFERENCE SIGNS LIST 1 light incidence part (i.e., light incidence unit)
2 concave diffraction grating (i.e., diffraction grating)
3 movable light reflection part (i.e., reflection unit)
4 light output part (i.e., light output unit)
5 substrate (i.e., second substrate)
6 substrate (i.e., first substrate)
7 driving circuit (i.e., driving unit)
8 beam part 10A through 10I spectrometer
11 light reflection unit
14 resin layer
15 reflection member
17 spacer (i.e., intervening member)
18 light detecting part (i.e., light detecting unit)
19 substrate (i.e., third substrate)
20 specific wavelength detecting device (i.e., specific wavelength detecting unit)
21 light detecting element (i.e., light detector)
22 band-pass filter
23 light interception member
24 light output part (i.e., second light output unit)
50A through 50E spectrometer

The invention claimed is:

1. A spectrometer, comprising:
a light incidence member including an input passage configured to allow incidence of light from outside;
a concave diffraction grating configured to disperse, according to wavelength, the light that is incident through the input passage; and
a reflector including a reflection surface to reflect the dispersed light that has been dispersed according to wavelength by the diffraction grating toward an output passage,
wherein tilt of the reflection surface is changeable and the light incident through the input passage is reflected only twice before passing through the output passage.

2. The spectrometer according to claim 1, further comprising a driving circuit configured to drive the reflector to control tilt of the reflection surface.

3. The spectrometer according to claim 1, wherein a light output member, which includes the output passage, and the diffraction grating are formed on a single substrate.

4. The spectrometer according to claim 3, wherein the diffraction grating is formed such that a normal line with respect to a center of the diffraction grating is not at a right angle to a substrate surface on which the diffraction grating is formed.

5. The spectrometer according to claim 1, wherein the light incidence member and the reflector are formed on a single substrate.

6. The spectrometer according to claim 1, wherein a light output member, which includes the output passage, and the light incidence member are formed on a single substrate.

7. The spectrometer according to claim 1, further comprising:
a first substrate;
a second substrate; and
an intervening member arranged between the first substrate and the second substrate,
wherein the light incidence member and the reflector are formed on the first substrate,
wherein a light output member, which includes the output passage, and the diffraction grating are formed on the second substrate, and
wherein each of the first substrate and the second substrate is joined to the intervening member.

8. The spectrometer according to claim 1, further comprising:
a first substrate;
a second substrate; and
a third substrate arranged between the first substrate and the second substrate, the third substrate being not parallel to the first substrate and the second substrate,
wherein the reflector is formed on the first substrate,
wherein the diffraction grating is formed on the second substrate,
wherein the light incidence member and a light output member, which includes the output passage, are formed on the third substrate, and
wherein each of the first substrate and the second substrate is joined to the third substrate.

9. The spectrometer according to claim 1, further comprising a light detector configured to detect the light after being output through the output passage.

10. The spectrometer according to claim 1, further comprising a light detector configured to detect the light after being reflected by the reflector.

11. The spectrometer according to claim 1, further comprising a specific wavelength detector configured to detect light with a specific wavelength out of the light reflected by the reflector.

12. The spectrometer according to claim 11, wherein the specific wavelength detector and the diffraction grating are formed on a single substrate.

13. The spectrometer according to claim 11,
wherein the specific wavelength detector includes a light detector and a band-pass filter, and
wherein the light detector and the band-pass filter are monolithically formed on a same substrate.

14. The spectrometer according to claim 11, further comprising another output passage to output the light reflected by the reflector towards the specific wavelength detector, the specific wavelength detector being externally provided.

15. The spectrometer according to claim 14, wherein another light output member, which includes the another output passage, and the diffraction grating are formed on a same substrate.

16. The spectrometer according to claim 11, wherein the driving circuit is further configured to control a time interval of a detection signal indicative of the light with the specific wavelength that is detected by the specific wavelength detector to be constant, such that the tilt of the reflector is controlled to be in a constant range.

17. The spectrometer according to claim 11, wherein an order of diffraction of the light detected by a light detector is different from an order of diffraction of the light with the specific wavelength that is detected by the specific wavelength detector.

18. An analysis equipment, comprising:
a light source; and
the spectrometer according to claim 1.

19. A wavelength-tunable light source, comprising:
a light source; and
the spectrometer according to claim 1.

20. The spectrometer of claim 1, further comprising a single light sensor configured to receive the light passing through the output passage.

21. A spectrometer, comprising:
a light incidence member including an input passage configured to allow incidence of light from outside;
a concave diffraction grating configured to disperse, according to wavelength, the light that is incident through the input passage; and
a reflector including a reflection surface to reflect the dispersed light that has been dispersed according to wavelength by the diffraction grating toward an output passage,
wherein tilt of the reflection surface is changeable, and
wherein the spectrometer further comprises a specific wavelength detector configured to detect light with a specific wavelength, and another output passage to output the light reflected by the reflector towards the specific wavelength detector.

22. The spectrometer of claim 21, wherein the specific wavelength detector is externally provided and is configured to detect the light with the specific wavelength out of the light reflected by the reflector.

* * * * *